United States Patent
Oh et al.

(10) Patent No.: US 12,019,861 B2
(45) Date of Patent: Jun. 25, 2024

(54) ELECTRONIC APPARATUS AND THE METHOD FOR CONTROLLING THEREOF

(71) Applicant: Samsung Electronics Co., Ltd., Suwon-si (KR)

(72) Inventors: Junhwa Oh, Suwon-si (KR); Woochan Kim, Suwon-si (KR); Dahye Kim, Suwon-si (KR); Sookkyung Lee, Suwon-si (KR); Hyunbin Lee, Suwon-si (KR); Dale Ahn, Suwon-si (KR); Seunghwan Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/051,588

(22) PCT Filed: Sep. 29, 2020

(86) PCT No.: PCT/KR2020/013312
§ 371 (c)(1),
(2) Date: Jun. 30, 2022

(87) PCT Pub. No.: WO2021/066509
PCT Pub. Date: Apr. 8, 2021

(65) Prior Publication Data
US 2022/0334710 A1   Oct. 20, 2022

(30) Foreign Application Priority Data
Oct. 4, 2019 (KR) .................. 10-2019-0123175

(51) Int. Cl.
*G06F 3/04883* (2022.01)
*G06F 3/04842* (2022.01)
(Continued)

(52) U.S. Cl.
CPC ...... *G06F 3/04883* (2013.01); *G06F 3/04842* (2013.01); *G06F 40/171* (2020.01); *G06V 30/32* (2022.01)

(58) Field of Classification Search
CPC .... G06F 3/0483; G06F 3/0482; G06F 3/0484; G06F 3/04847; G06F 3/04883;
(Continued)

(56) References Cited

U.S. PATENT DOCUMENTS

2006/0265657 A1* 11/2006 Gilley ................ H04N 21/4402
705/14.69
2011/0310039 A1* 12/2011 Kim ...................... G06F 3/0481
345/173

(Continued)

FOREIGN PATENT DOCUMENTS

JP         2015-225525 A    12/2015
KR  10-2009-0023915 A     3/2009
(Continued)

OTHER PUBLICATIONS

International Search Report with Written Opinion dated Jan. 8, 2021; International Appln. No. PCT/KR2020/013312.

*Primary Examiner* — Pei Yong Weng
(74) *Attorney, Agent, or Firm* — Jefferson IP Law, LLP

(57) ABSTRACT

An electronic device is provided. The electronic device includes a display, a sensing panel, and a processor operatively connected with the display and the sensing panel, wherein the processor is configured to display content on the display, display an object corresponding to a handwriting input on the content, based on the handwriting input sensed by the sensing panel, in response to a first keyword being recognized based on at least part of the handwriting input, perform character recognition on an additional handwriting input entered after input of the first keyword, and in response to a character recognition end event being identified, provide text obtained by the character recognition on the additional handwriting input as a hashtag for the displayed content.

18 Claims, 16 Drawing Sheets

(51) Int. Cl.
*G06F 40/171* (2020.01)
*G06V 30/32* (2022.01)

(58) Field of Classification Search
CPC .............. G06F 3/04886; A61N 5/1048; A61N 2005/1074; A61N 5/1067; A61N 5/1081; A61N 2005/1059; A61N 5/1049; G16H 10/60; G16H 20/40; G16H 40/20; G16H 40/63; G16H 30/20; G16H 40/67; G16H 30/40
See application file for complete search history.

(56) References Cited

U.S. PATENT DOCUMENTS

| | | | |
|---|---|---|---|
| 2014/0015780 A1* | 1/2014 | Kim .................... | G06F 16/9554 345/173 |
| 2015/0193104 A1 | 7/2015 | Cho et al. | |
| 2015/0346996 A1 | 12/2015 | Ogawa et al. | |
| 2016/0188011 A1* | 6/2016 | Lee ......................... | G06F 3/033 345/629 |
| 2016/0328401 A1* | 11/2016 | Dhawan .............. | G06F 16/9535 |
| 2018/0006992 A1 | 1/2018 | Siswadi et al. | |
| 2018/0095653 A1* | 4/2018 | Hasek ................. | G06F 3/04883 |
| 2018/0152500 A1 | 5/2018 | Park | |
| 2018/0181997 A1* | 6/2018 | Sanjeevaiah Krishnaiah .............. | H04L 67/53 |
| 2018/0349021 A1 | 12/2018 | Rubalcava et al. | |

FOREIGN PATENT DOCUMENTS

| | | |
|---|---|---|
| KR | 10-2014-0019206 A | 2/2014 |
| KR | 10-2015-0082841 A | 7/2015 |
| KR | 10-2016-0080601 A | 7/2016 |
| KR | 10-2017-0056833 A | 5/2017 |
| KR | 10-1912237 B1 | 10/2018 |
| KR | 10-2019-0066732 A | 6/2019 |

* cited by examiner

ELECTRONIC APPARATUS AND THE METHOD FOR CONTROLLING THEREOF

CROSS-REFERENCE TO RELATED APPLICATION(S)

This application is a National Phase Entry of PCT International Application No. PCT/KR2020/013312, which was filed on Sep. 29, 2020 and claims priority to Korean Patent Application No. 10-2019-0123175, which was filed on Oct. 4, 2019 in the Korean Intellectual Property Office, the contents of which are incorporated herein by reference.

TECHNICAL FIELD

The disclosure relates to an electronic device performing operations according to handwriting inputs and a method of controlling the same.

BACKGROUND ART

With digital technology advancing, electronic devices come in various types, such as smartphones, tablet personal computers (PCs), or personal digital assistants (PDAs). As technology grows, electronic devices are able to perform more diversified functions. To perform a desired function on an electronic device controllable by touch input, an application icon, menu icon, or function icon displayed on the screen needs to be selected.

Meanwhile, as the amount of information generated as electronic devices are used recently increases exponentially, significant effort and time are required to search for necessary information. Thus, techniques for classifying and easily searching for a great amount of information are being developed.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may use hashtags for classifying and searching for content. A hashtag is a kind of metadata created to facilitate file classification and search and is used in such a manner that a hash symbol (e.g., #) is followed by a word or phrase without spacing. For example, an electronic device may receive information about the hashtag for a specific file being created and store the specific file, with the hashtag associated with the specific file. The electronic device may classify and manage files based on hashtags or provide a hashtag-based search function. The electronic device needs to enter text via a physical or virtual keyboard to receive a hashtag or search for a hashtag-entered content. Such a situation where a keyword or search word is entered via the physical or virtual keyboard while controlling the electronic device via a pen or finger causes user inconvenience.

Meanwhile, all of the functions of the electronic device were unable to be displayed on the same screen, and several steps of menu selection should be taken to perform a desired function.

The above information is presented as background information only to assist with an understanding of the disclosure. No determination has been made, and no assertion is made, as to whether any of the above might be applicable as prior art with regard to the disclosure.

Aspects of the disclosure are to address at least the above-mentioned problems and/or disadvantages and to provide at least the advantages described below. Accordingly, an aspect of the disclosure is to provide an electronic device providing a hashtag based on a keyword identified during handwriting input and method of controlling the electronic device.

Additional aspects will be set forth in part in the description which follows and, in part, will be apparent from the description, or may be learned by practice of the presented embodiments.

In accordance with an aspect of the disclosure, an electronic device and method of controlling the same are provided. The electronic device and the method provide a hashtag based on a keyword identified during handwriting input and the result of character recognition for the handwriting input and enable easy search for content.

In accordance with another aspect of the disclosure, an electronic device and method of controlling the same are provided. The electronic device and the method provide a function based on a keyword identified during handwriting input, position information about input of the keyword, and the kind of handwriting-entered content.

Technical Solution

Various respective aspects and features of the disclosure are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

In accordance with various embodiments, an electronic device comprises a display, a sensing panel, and a processor operatively connected with the display and the sensing panel, wherein the processor is configured to display content on the display, display an object corresponding to a handwriting input on the content, based on the handwriting input sensed by the sensing panel, in response to a first keyword being recognized based on at least part of the handwriting input, perform character recognition on an additional handwriting input entered after the first keyword, and in response to a character recognition end event being identified, provide text obtained by the character recognition on the additional handwriting input as a hashtag for the displayed content.

In accordance with various embodiments, a method of controlling an electronic device may comprise displaying content on a display, displaying an object corresponding to a handwriting input on the content, based on the handwriting input sensed by a sensing panel, in response to a first keyword being recognized based on at least part of the handwriting input, performing character recognition on an additional handwriting input entered after the first keyword, and in response to a character recognition end event being identified, providing text obtained by the character recognition on the additional handwriting input as a hashtag for the content.

In accordance with various embodiments, an electronic device comprises a display, a sensing panel, a memory, and a processor operatively connected with the display, the sensing panel, and the memory, wherein the processor is configured to display content on the display, display an object, on the content, corresponding to a handwriting input, based on the handwriting input sensed by the sensing panel, in response to one of a plurality of keywords, respectively corresponding to a plurality of functions stored in the memory, being recognized based on at least part of the handwriting input, obtain position information about the keyword entered on the sensing panel, and perform a function corresponding to the entered keyword for a region related to the obtained position information of the displayed content based on information about the displayed content.

Other aspects, advantages, and salient features of the disclosure will become apparent to those skilled in the art from the following detailed description, which, taken in conjunction with the annexed drawings, discloses various embodiments of the disclosure.

It is an aim of certain embodiments of the disclosure to solve, mitigate or obviate, at least partly, at least one of the problems and/or disadvantages associated with the prior art. Certain embodiments aim to provide at least one of the advantages described below.

Advantageous Effects

As is apparent from the foregoing description, according to various embodiments, although all of the functions of the electronic device are not displayed as buttons on the screen, various functions may be performed via handwriting input.

According to various embodiments, if a keyword for hashtag input via handwriting input is recognized, the subsequent handwriting input may be character-recognized in real-time and, thus, it may be immediately provided as a hashtag while creating a page, and user convenience may be enhanced.

According to various embodiments, content may be discovered via a hashtag search, rather than the entire text of a page, and this way allows for an easier search for desired content.

BRIEF DESCRIPTION OF DRAWINGS

The above and other aspects, features and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
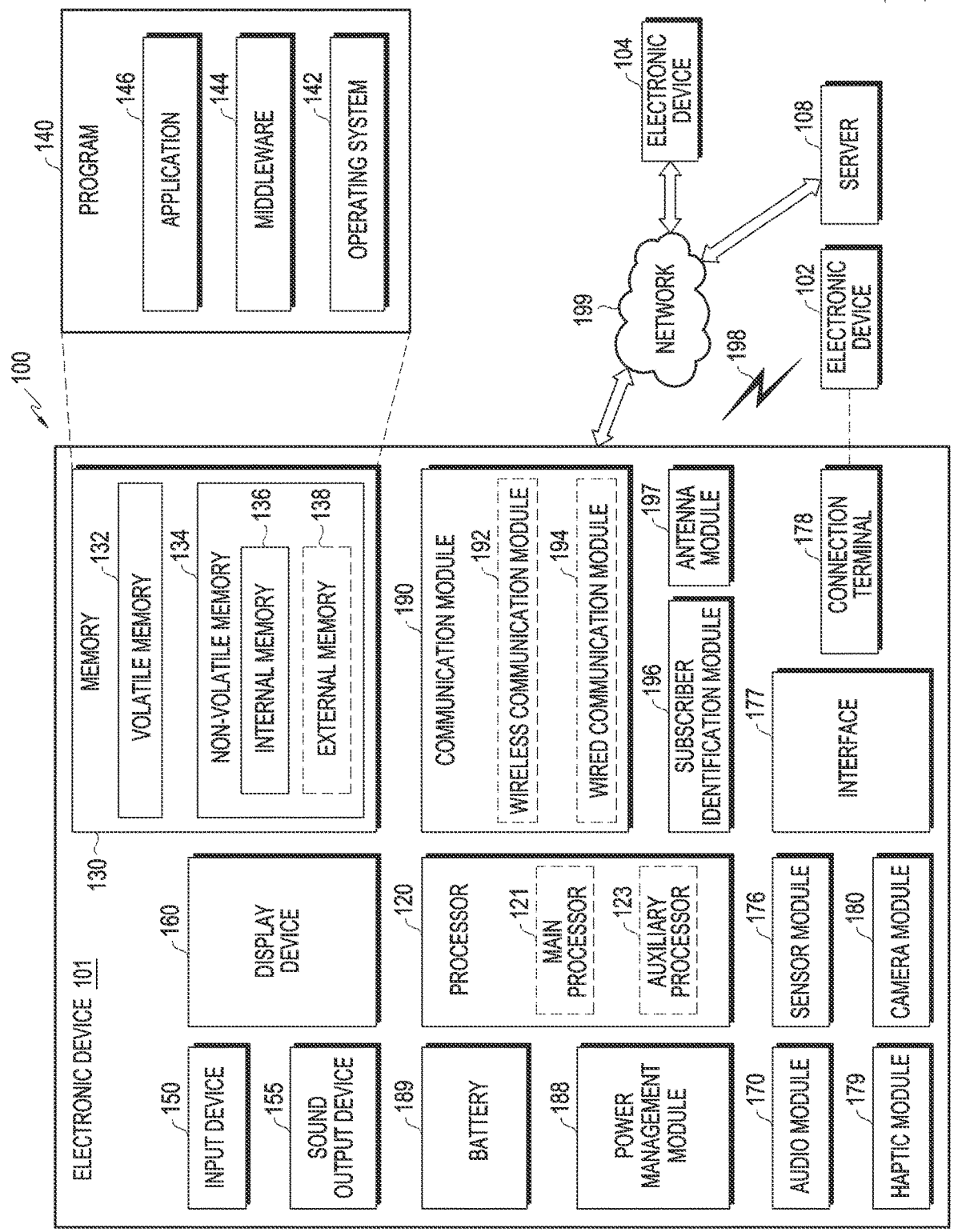
FIG. 1 is a view illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
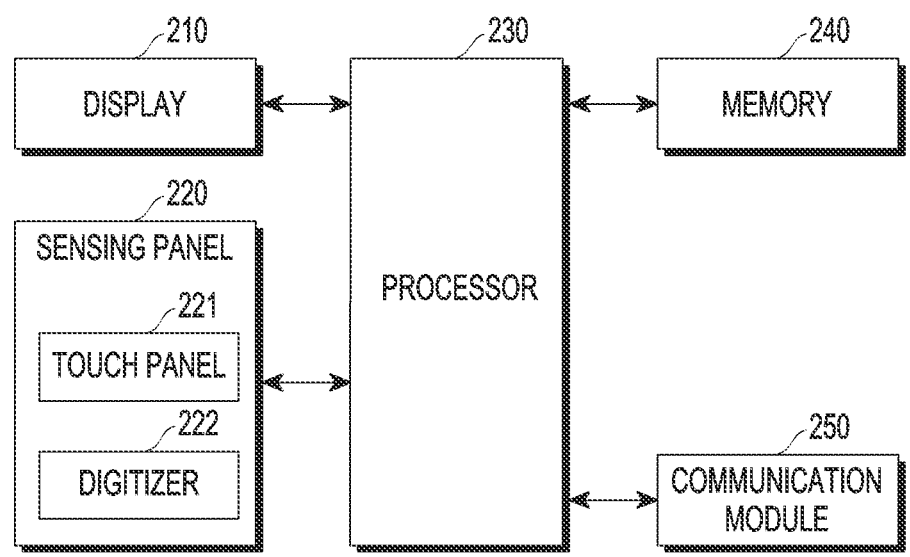
FIG. 2 is a block diagram illustrating an electronic device capable of operating based on handwriting input, according to an embodiment of the disclosure.

FIG. 2 is a block diagram illustrating an electronic device capable of operating based on handwriting input, according to an embodiment of the disclosure.

According to various embodiments, an electronic device 101 (e.g., the electronic device 101) may include a display 210, a sensing panel 220, a processor 230, a memory 240, and a communication module 250.

According to various embodiments, the display 210 (e.g., the display device 160) may receive a control signal or graphic signal under the control of the processor 230 and display a corresponding screen.

According to various embodiments, the display 210 may display content received from an external device via the communication module 250 (e.g., the communication module 190) or content stored in the memory 240 (e.g., the memory 130). According to various embodiments, content may mean a single file (or a set of files) that may be loaded by the processor 230 and displayed by the display 210 or that may be transmitted to the outside via the communication module 250, but is not limited to a specific kind or format. For example, the kind of content may include at least one of text documents, applications, photos, pictures, or videos, but is not limited thereto as mentioned above. Content may be executed via, e.g., a designated application, and an application execution screen corresponding to the result of execution may be displayed on the display 210. Content may be edited by the user.

According to various embodiments, the display 210 may display an object corresponding to a handwriting input sensed by the sensing panel 220. For example, the object corresponding to the handwriting input may be a visualized touch trajectory of a pen or finger on the sensing panel 220.

According to various embodiments, the sensing panel 220 may receive a user input and transfer the user input to the processor 230. The sensing panel 220 may include at least one of a touch panel 221 or a digitizer 222.

According to various embodiments, the touch panel 221 may sense the user's touch input. According to various embodiments, the touch panel 221 may be implemented in various types, such as capacitive, resistive, or piezoelectric. In the capacitive type, a tiny amount of electricity created when the user's body portion touches the surface of the touch panel using a dielectric coated on the surface of the touch panel 221 may be detected to obtain the coordinates of the touch. In the resistive type, a current flow generated when two electrode plates embedded in the touch panel 221 come in contact at the touched spot as the user touches the screen may be sensed to compute the coordinate of the touch. The touch panel 221 may detect a touch (or hovering) input by the user's body part (e.g., finger) and transfer touch information (e.g., at least one of the position or kind of the touch) to the processor 230. In the disclosure, the touch panel 221 may include a touchscreen panel with a plurality of electrodes and a touchscreen panel IC (TSP IC). Meanwhile, the touch panel 221 may detect a touch (or hovering) by at least one of an active electrostatic solution (AES)-type pen or electro capacitive resonance (ECR)-type pen.

According to various embodiments, the digitizer 222 may include a sensor board (e.g., an EMR sensing panel) including a loop coil array to be able to operate in an electromagnetic resonance (EMR) sensing scheme. The digitizer 222 may include an EMR sensing panel and a controller for processing electrical signals output from the EMR sensing panel. According to an embodiment, the display 210 may be installed between the EMR sensing panel and a window for protecting the display 210 of the electronic device 101.

According to various embodiments, the window may be formed of reinforced glass forming an outer layer of the sensing panel.

Meanwhile, the digitizer according to the above-described EMR sensing scheme has multiple coils on the sensor board and senses an electromagnetic variation caused by an approach of a resonance circuit included in the pen to thereby grasp the position of the pen. Thus, unlike, e.g., the resistive type, the EMR sensing scheme-based digitizer does not require the EMR sensing panel to be placed at the top of the display 210 but, rather, the EMR sensing panel may be mounted at the bottom of the display 210. Further, it may be provided as a multi-input device capable of simultaneously using an EMR scheme-based EMR sensing panel and a capacitive scheme-based touch panel 221 capable of sensing the user's finger. The multi-input device may be of the type in which a display is placed on the EMR sensing panel, and the touch panel 221, which may measure a variation in capacitance at the contact point of the user's finger and measure the input point of the finger, is placed on the display.

The processor 230 may be operatively connected with the display 210, sensing panel 220, memory 240, and communication module 250 to control the overall operation and function of the electronic device 101.

According to various embodiments, the processor 230 may control the display 210 to display content. For example, the content displayed on the display 210 may be one selected by the user. According to various embodiments, one of ordinary skill in the art will readily appreciate that displaying content means that the electronic device 101 executes the content using a corresponding application and displays the application execution screen (e.g., an application execution screen corresponding to the content).

According to various embodiments, based on a handwriting input sensed by the sensing panel 220, the processor 230 may display an object corresponding to the handwriting input on the displayed content.

According to various embodiments, upon recognizing a keyword (hereinafter, referred to as a first keyword) for hashtag input based on at least a portion of the handwriting input, the processor 230 may perform character recognition on additional handwriting input after input of the first keyword.

According to various embodiments, the hashtag is a kind of metadata created to facilitate file (e.g., content) classification and search and is used in such a manner that a hash symbol (e.g., #) is followed by a word or phrase without spacing. In the disclosure, a hashtag for content is generated and stored to thereby facilitate a classification and search for stored contents.

According to various embodiments, the processor 230 may recognize a preset number of strokes entered recently of the handwriting input and, if the preset number of strokes is the first keyword, perform character recognition on a handwriting input made after the first keyword.

According to various embodiments, the processor 230 may recognize the preset number of strokes via character recognition or image recognition. According to various embodiments, the preset number may be the number of the strokes of the first keyword for hashtag input. For example, the processor 230 may recognize the preset number of strokes using an optical character recognition (OCR) scheme which is a character recognition scheme. In another embodiment, the processor 230 may recognize the preset number of strokes via the similarity obtained by comparing an image indicating the first keyword pre-stored in the memory 240 and an image including the preset number of strokes.

According to various embodiments, upon identifying a character recognition end event while character recognition is performed, the processor 230 may provide the text obtained by character recognition as a hashtag for the displayed content. For example, the processor 230 may perform character recognition on the handwriting input made before the character recognition end event is identified after the first keyword input.

According to various embodiments, the character recognition end event means a triggering operation for terminating the character recognition operation on the entire handwriting input after input of the first keyword. For example, the character recognition end event may include when the character recognition handwriting input contains a blank with a preset size or more or no handwriting is entered for a preset time or longer. Based on the no-spacing nature of hashtags, the electronic device may determine that the handwriting input for hashtag input has been completed if the handwriting input contains a blank with a preset size or more or no handwriting is entered for a preset time or longer.

According to various embodiments, if character recognition on the handwriting input after input of the first keyword is terminated, the electronic device may terminate the handwriting input character recognition operation itself or may perform character recognition only on a preset number of strokes entered recently.

Figure 11:
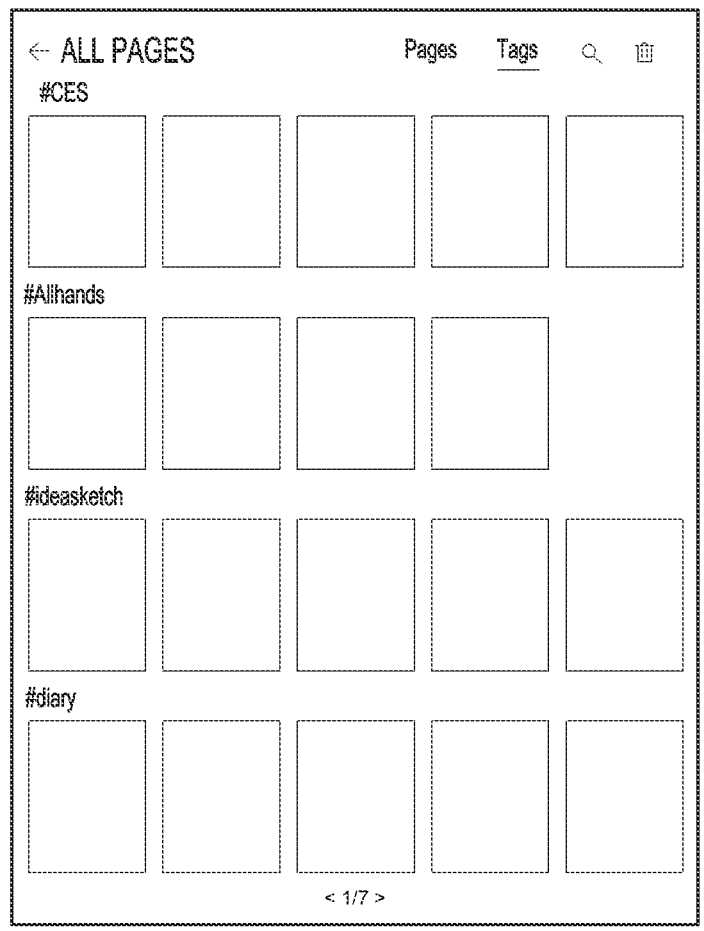
FIG. 11 is a view illustrating a plurality of contents classified based on a hashtag, according to an embodiment of the disclosure.
Figure 12:
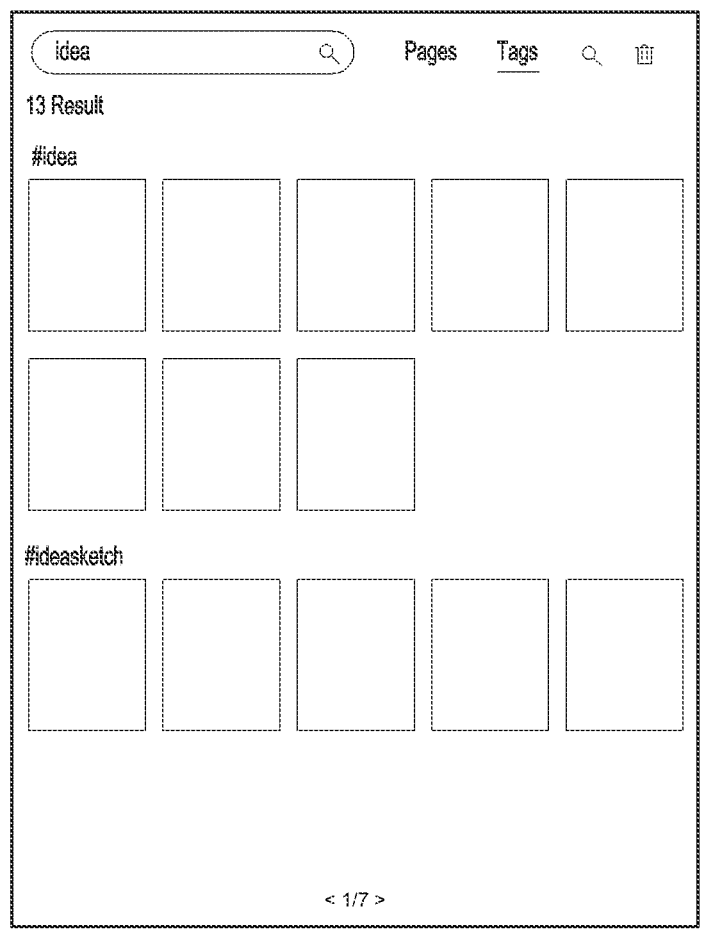
FIG. 12 is a view illustrating an embodiment of searching for content using a hashtag, according to an embodiment of the disclosure.

According to various embodiments, the operation of providing as a hashtag may mean the operation of storing the displayed content and the created hashtag in the memory 240, with them associated together, as shown in FIGS. 11 and 12. According to another embodiment, the operation of providing as a hashtag may mean displaying the created hashtag in a preset region for displaying a hashtag, on the displayed content.

According to various embodiments, the content displayed on the display 210 may further include a preset region for input of a hashtag. For example, upon determining that that handwriting input has been performed in the preset region for input of a hashtag, based on the position information about a handwriting input on the display 210, the processor 230 may perform character recognition on the handwriting input in the preset region for hashtag input and provide text obtained by the character recognition, as a hashtag for the content. According to various embodiments, after provided as the hashtag, the object corresponding to the handwriting input in the preset region for hashtag input may be deleted out. For example, the object corresponding to the handwriting input may include the image indicating the trajectory of the handwriting input of the first keyword (e.g., #) and text input after the first keyword.

As described above, the operation of providing a hashtag based on the position of the handwriting input on the content is described below in greater detail with reference to FIG. 4.

According to various embodiments, the processor 230 may associate and manage a displayed hashtag and an object corresponding to a handwriting input related to the hashtag. For example, if the displayed hashtag is deleted, the processor 230 may delete an object corresponding to the deleted hashtag from among all of a plurality of objects corresponding to the handwriting input displayed on the content. Thus, only objects corresponding to handwriting entries which are irrelevant to the hashtag may be displayed on the content screen. According to the above-described embodiment, as a hashtag and an object corresponding to a handwriting input used upon generating the hashtag may be associated and managed, user convenience may be enhanced. The above-described embodiment is described below in greater detail with reference to FIGS. 6A and 6B.

According to various embodiments, if display content is a video, the processor 230 may identify a frame, which is displayed at the time when the first keyword is recognized, among a plurality of frames included in the video. The processor 230 may provide text obtained by character-recognizing an additional handwriting input made after input of the first keyword and information about the identified frame, as a hashtag for the displayed content. According to various embodiments, the processor 230 may associate the obtained text and the information about the identified frame with the displayed content and store them in the memory 240. In another embodiment, the processor 230 may display a first user interface to indicate the progress status of the video and display a second user interface including the text obtained in the corresponding region at the time when the first keyword is recognized on the first user interface. According to various embodiments, when the user inputs a manipulation of selecting the second user interface while the video is being played, the processor 230 may display from the frame at the time of recognition of the first keyword.

According to the above-described embodiment, as a hashtag is provided based on a handwriting input received while a video is played, a video search and A-B repeat on the video are performed easily, contributing to user convenience. Meanwhile, the above-described embodiment is described below in greater detail with reference to FIGS. 7A and 7B.

According to various embodiments, upon recognizing a first keyword for hashtag input based on handwriting input, the processor 230 may provide at least one recommendation hashtag based on the position of the first keyword entered according to input of the first keyword along with the operation of performing character recognition on an additional handwriting input made after the first keyword. According to various embodiments, if the displayed content is an application for creating a text document, e.g., a memo, the recommendation hashtag may include at least one hashtag related to at least one text document pre-stored in the memory 240. For example, the processor 230 may recommend a hashtag used in a text document similar to the text document being currently created among a plurality of text documents pre-stored in the memory 240, as a hashtag of the text document being currently created. According to various embodiments, the similar text document may mean a text document which has a similar appearance pattern of words recognized from a page. To that end, the processor 230 may character-recognize, in real-time, the text document being created by handwriting input or, if a keyword for hashtag input is recognized, perform character recognition on the handwriting input before the keyword is entered.

In another embodiment, the processor 230 may recommend a hashtag which the user has already used. For example, the processor 230 may recommend a hashtag, which used to be frequently used, based on the frequencies of the hashtags which the user has used.

According to various embodiments, if the user selects one of at least one recommended hashtag, the processor 230 may display the selected hashtag in a preset region for displaying hashtags, of the content screen. According to various embodiments, if one or more hashtags among a plurality of recommended hashtags are continuously selected, the processor 230 may provide several hashtags as hashtags of the displayed content.

According to various embodiments, if the content is a photo, picture, or such an image or a video, the processor 230 may recognize an object in the handwriting-entered region on the content based on the obtained position information. According to various embodiments, the processor 230 may obtain information about the object including, e.g., the kind and name of the object in the handwriting-entered region on the content, via image analysis. According to various embodiments, if the displayed content is a video, the electronic device may recognize an object included in the region where a keyword for hashtag input is recognized on the frame displayed at the time of recognition of the keyword. Such object recognition operation may be performed by the processor 230 if the memory 240 stores object recognition software, or a result of recognition of the object may be received via an external server for object recognition.

Figure 10:
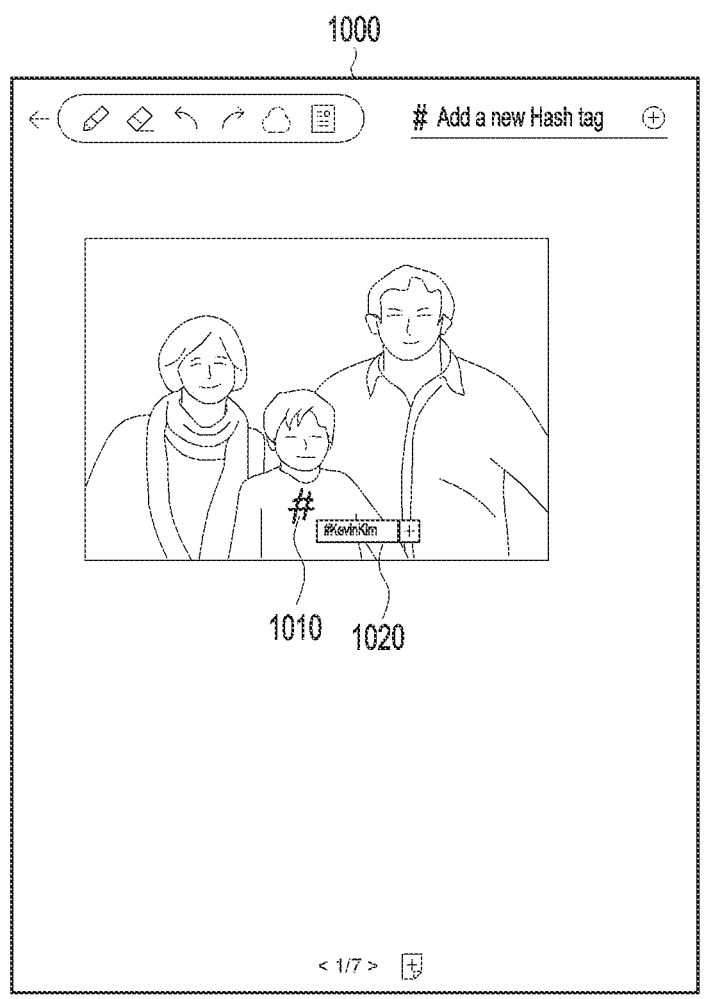
FIG. 10 is a view illustrating a hashtag recommendation operation according to an embodiment of the disclosure.

FIG. 10 is a view illustrating a hashtag recommendation operation according to an embodiment of the disclosure.

According to various embodiments, the processor 230 may provide a result of object recognition as a recommendation hashtag. This embodiment is described below in greater detail with reference to FIG. 10.

According to various embodiments, a keyword for each of various functions, as well as the first keyword (#) for hashtag input may be entered via handwriting input. According to various embodiments, the keyword related to each function and query information may be previously stored in the memory 240. For example, the keyword for hashtag input may be '#,' the keyword for searching for information about the recognized object may be '?,' and the keyword for linking to the site for purchasing the recognized object may be '$.' Such a relationship between function and keyword is merely an example and may be modified according to the settings of the manufacturer of the electronic device 101 or the user's settings.

According to various embodiments, if a keyword related to a function other than the first keyword is recognized via handwriting input, the processor 230 may transmit the displayed content, obtained position information, and query information for performing the function corresponding to the entered keyword to an external server via the communication module 250.

According to various embodiments, upon receiving response information corresponding to the query information transmitted from the external server, via the communication module 250, the processor 230 may control the display 210 to display the received response information in a region related to the obtained position information on the displayed content. The embodiment of transmitting the query information corresponding to the handwriting-entered keyword to the external server and receiving and displaying the corresponding response information is described below in greater detail with reference to FIGS. 13 to 15.

The memory 240 may store various data used by at least one component of the electronic device 211. For example, the data may include, for example, software and input data or output data for a command related thereto. According to various embodiments, the memory 240 may include a volatile or non-volatile memory.

According to various embodiments, the memory 240 may store query information and keywords related to various functions of the electronic device 101, with the keywords matched with the query information. According to various embodiments, if a keyword is entered via handwriting input, the corresponding function may be performed.

According to various embodiments, the memory 240 may store various contents. For example, the plurality of contents may be classified based on the hashtag contained in each content and be stored. According to an embodiment, if the content is a video, information about the frame displayed on the display 210 at the time of input of a keyword for hashtag input may also be stored in the memory 240.

According to various embodiments, the memory 240 may store the hashtag displayed on the content and the object corresponding to the handwriting input character-recognized upon creating the hashtag, with the hashtag associated with the object. In the case where the hashtag and the object are associated and stored, the processor 230 may delete the object related to the hashtag among a plurality of objects corresponding to the handwriting input on the content as the hashtag is deleted.

According to various embodiments, the result of recognition of the object included in the region where the handwriting input has been performed on the content on the display 210 may be associated with the displayed content and be stored in the memory 240.

The communication module 250 may include a wireless communication module (e.g., a cellular communication module, a Wi-Fi communication module, a Bluetooth communication module, a near-field communication (NFC) communication module, or a global navigation satellite system (GNSS) communication module) or a wired communication module (e.g., a local area network (LAN) communication module or a power line communication (PLC) module). Among these communication modules, the corresponding communication module may communicate with the server 108 via a first network (e.g., the first network 198 of FIG. 1) or a second network (e.g., the second network 199 of FIG. 1).

According to various embodiments, the communication module 250 may include one or more communication processors that are operable independently from the processor 230 and supports direct (e.g., wired) communication or wireless communication.

According to various embodiments, the communication module 250 may transmit at least one of content data, position information obtained as a keyword is entered via handwriting input, and query information corresponding to the keyword to the server (e.g., the server 108 of FIG. 1) and receive response information corresponding thereto.

Meanwhile, although not shown in FIG. 2, the electronic device 101 may further include a pen holder unit for keeping a stylus pen. According to various embodiments, the pen holder unit may be provided to have the stylus pen inserted and kept in a portion of the electronic device 101 or to have the stylus pen attached onto an external surface of the electronic device 101. Meanwhile, the electronic device 101 may further include a button, a camera, or a speaker according to various embodiments.

Figure 3:
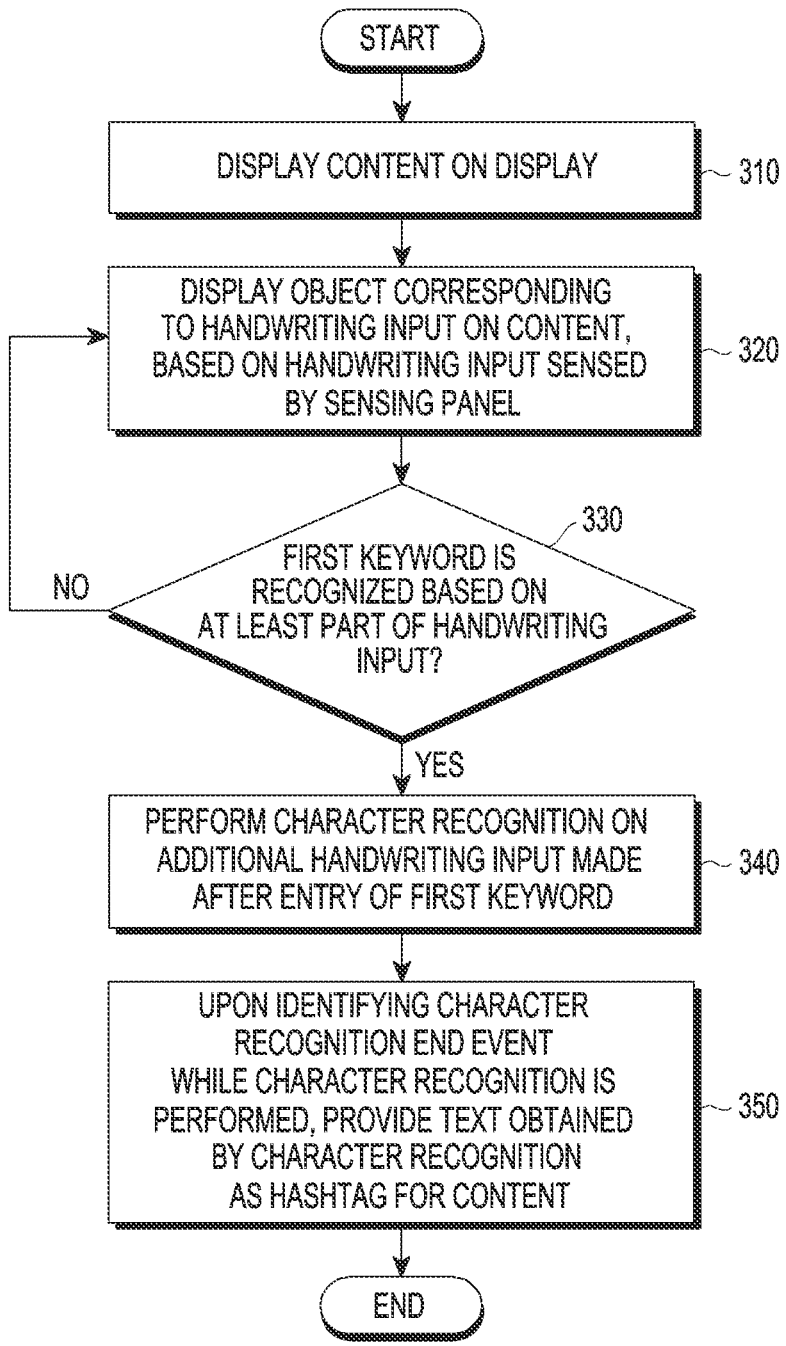
FIG. 3 is a flowchart illustrating operations of an electronic device providing a hashtag by handwriting input, according to an embodiment of the disclosure.

FIG. 3 is a flowchart illustrating operations of an electronic device providing a hashtag by handwriting input, according to an embodiment of the disclosure.

According to various embodiments, the electronic device 101 (e.g., at least one processor (e.g., the processor 230)) may display content on the display 210 in operation 310. For example, the displayed content may be at least one of a text document, an application for creating a text document, a photo, a picture, and a video. The electronic device 101 may display preexisting content based on an execution command for the preexisting content. Or, the electronic device 101 may display new content based on a new content creation command.

According to various embodiments, based on a handwriting input sensed by the sensing panel 220 after the content is displayed, the processor 101 may display an object corresponding to the handwriting input on the content in operation 320. According to various embodiments, the handwriting input may be performed by at least one of a stylus pen or finger touch. For example, the object corresponding to the handwriting input may be a visualized touch trajectory of at least one of a pen or finger on the sensing panel 220.

According to various embodiments, the electronic device 101 may determine whether a first keyword is recognized based on at least part of the handwriting input in operation 330. For example, the electronic device 101 may recognize a preset number of strokes entered recently of the handwriting input and determine whether the entered handwriting is the first keyword. For example, the preset number may be the number of the strokes of the first keyword.

According to various embodiments, the electronic device 101 may character-recognize the preset number of strokes entered recently and determine whether the entered handwriting is the first keyword. For example, the electronic device 101 may perform character recognition on the preset number of strokes entered recently, via OCR.

In another embodiment, the electronic device 101 may image-recognize the preset number of strokes entered recently and determine whether the entered handwriting is the first keyword. If the electronic device 101 recognizes the entered handwriting via image recognition, the electronic device 101 may compare an image composed of a preset number of strokes with a plurality of pre-stored images corresponding to the first keyword, thereby determining whether the strokes are the first keyword. For example, the electronic device 101 may compare the image composed of the preset number of strokes with each of the plurality of pre-stored images corresponding to the first keyword, thereby obtaining a similarity per image. If the average of the obtained similarities is a preset value or more, the electronic device 101 may determine that the preset number of strokes is the first keyword. Or, the electronic device 101 may store a classification model trained based on a handwriting image database for a plurality of first keywords, enter the image composed of the preset number of strokes to the classification model, and identify whether the first keyword is recognized based on the result of output from the classification model. This is merely an example, and various schemes for recognizing an object included in an image may be used.

According to various embodiments, if the first keyword is not recognized from the handwriting input (no in 330), the electronic device 101 may repeat operation 320 of displaying the object corresponding to the handwriting input on the content.

According to various embodiments, if the first keyword is recognized based on at least part of the handwriting input (yes in 330), the electronic device 101 may perform character recognition on an additional handwriting input made after the first keyword is entered in operation 340. For example, the electronic device 101 may perform character recognition on at least part of the additional handwriting input made after the first keyword is entered.

According to various embodiments, upon identifying a character recognition end event while character recognition is performed, the electronic device 101 may provide the text obtained by character recognition as a hashtag for the content in operation 350. According to various embodiments, the character recognition end event means a triggering operation for terminating the character recognition operation on the entire handwriting input after input of the first keyword. For example, the character recognition end event may include when the character recognition handwriting input contains a blank with a preset size or more or no handwriting is entered for a preset time or longer. Based on the no-spacing nature of hashtags, the electronic device 101 may determine that the handwriting input for hashtag input has been completed if the handwriting input contains a blank with a preset size or more or no handwriting is entered for a preset time or longer.

According to various embodiments, if character recognition on the handwriting input after input of the first keyword is terminated, the electronic device 101 may terminate the handwriting input character recognition operation itself (e.g., terminating the character recognition program) or may perform character recognition only on a preset number of strokes entered recently.

Unlike the related art in which, after creating a page via handwriting input, character recognition is performed, as described above, if the first keyword is recognized, a handwriting input made thereafter may be character-recognized in real-time, enabling a hashtag to be immediately provided while creating the page and thus enhancing user convenience.

According to various embodiments, as described above, the operation of performing character recognition on the handwriting input for hashtag input may be performed after the first keyword is recognized. In another embodiment, the operation of performing character recognition on the handwriting input for hashtag input may be performed even when a handwriting is entered in a preset region for hashtag input on the content. As such, a specific operation in which character recognition is performed on handwriting input according to the position of handwriting input and it is provided as a hashtag is described below in detail with reference to FIG. 4.

Figure 4:
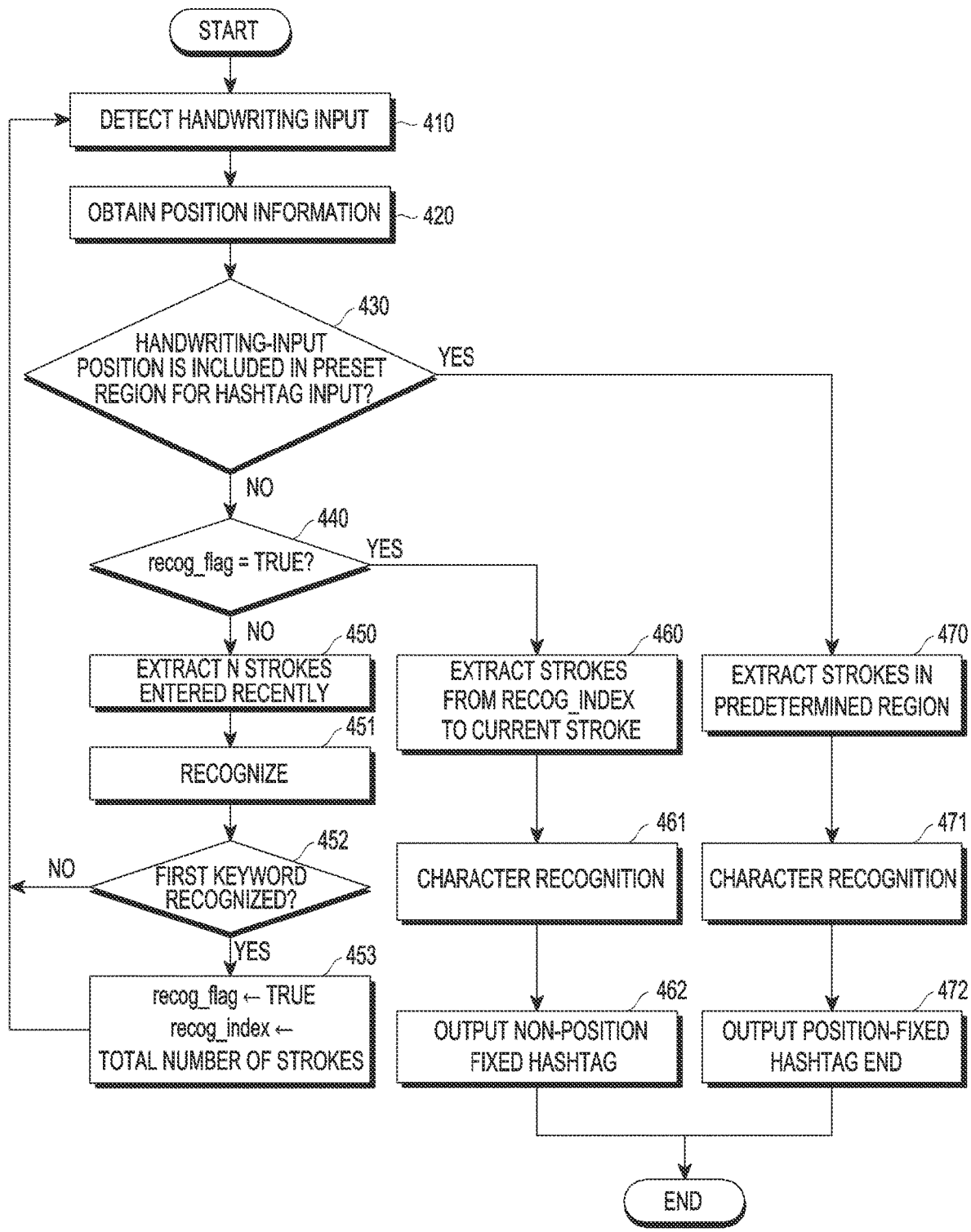
FIG. 4 is a flowchart illustrating operations of an electronic device providing a hashtag by the position of handwriting input, according to an embodiment of the disclosure.

FIG. 4 is a flowchart illustrating operations of an electronic device providing a hashtag by the position of handwriting input, according to an embodiment of the disclosure.

Referring to FIG. 4, according to various embodiments, in operation 410, the electronic device 101 may detect a handwriting input. For example, the electronic device 101 may detect a handwriting input made using at least one of a stylus pen or finger by the provided sensing panel 220.

According to various embodiments, in operation 420, the electronic device 101 may obtain position information about the handwriting input. For example, the electronic device 101 may detect, e.g., a pressure, capacitance, or induced magnetic field generated from the sensing panel 220 based on a touch on the sensing panel 220 by at least one of the stylus pen or finger. The electronic device 101 may detect the position of the pressure, capacitance, or induced magnetic field generated by the touch on the sensing panel 220, thereby obtaining position information about the touch input. For example, the position information may be coordinates or a set of coordinates on the sensing panel 220.

According to various embodiments, in operation 430, the electronic device 101 may determine whether the position of the handwriting input is included in a preset region for hashtag input. For example, like the preset region 530 for hashtag input shown in FIG. 5, the preset region for hashtag input is a partial region on the displayed content and, in the disclosure, the operation of providing a hashtag via the preset region for hashtag input may be denoted a 'position-fixed hashtag.'

According to various embodiments, if handwriting input is performed in the preset region for hashtag input, the electronic device 101 may character-recognize the entered handwriting and provide it as a hashtag for the displayed content. For example, if the position of the handwriting input is included in the preset region for hashtag input (yes in 430), the electronic device 101 may extract strokes in a determined region in operation 470 and perform character recognition on the extracted strokes in operation 471. The electronic device 101 may output the text obtained via character recognition as a position-fixed hashtag in operation 472. For example, the electronic device 101 may display the hashtag in the preset region on the screen. According to various embodiments, the content may be in the state of being displayed on the screen, and the hashtag may be displayed in a preset region on the content.

According to various embodiments, if the position of the handwriting input is not included in the preset region for hashtag input (no in 430), the electronic device 101 may identify whether the recognition flag (recog-flag) value is TRUE in operation 440. According to various embodiments, the recognition flag is one for determining whether character recognition is underway whenever a stroke is entered. For example, if the recognition flag value is TRUE, this means that character recognition is being performed on the handwriting entered stroke and, if the recognition flag value is not TRUE, this may mean that character recognition is not being performed on the handwriting entered stroke.

According to various embodiments, if the recognition flag value is not TRUE (no in 440), the electronic device 101 may extract n strokes entered recently among the handwriting entered strokes in operation 450. According to various embodiments, n may be the number of strokes of the first keyword. For example, if the first keyword is '#' which indicates that the subsequent handwriting input is a hashtag, the number of extracted strokes may be 4. According to various embodiments, "#" is merely an example of the first keyword, and embodiments of the disclosure are not limited. Various symbols may be set as the first keyword.

According to various embodiments, the electronic device 101 may recognize the n extracted strokes in operation 451 and determine whether the first keyword has been recognized in operation 452. The electronic device 101 may recognize the n strokes extracted via character recognition or image recognition and determine whether the first keyword has been recognized. For example, character recognition may be performed via optical character recognition (OCR) technology, and image recognition may be performed by comparing a plurality of pre-stored images related to the first keyword with the image including the extracted strokes. According to an embodiment, the electronic device 101 may perform character recognition or image recognition on the four strokes entered recently and determine whether the four strokes are the first keyword.

According to various embodiments, if the first keyword is not recognized based on stroke recognition (no in 452), the electronic device 101 may return to operation 410 for detecting a handwriting input and receive the user's handwriting input. Meanwhile, if the first keyword is recognized based on stroke recognition (yes in 452), the electronic device 101 may change the recognition flag value into TRUE and determine that the recognition index (recog_index) value is the number of all pre-entered strokes in operation 453. This reflects the strokes entered before the first keyword. For example, the recognition index value indicates the last stroke for which character recognition for obtaining hashtag is performed on a handwriting input to be entered later.

According to various embodiments, the electronic device 101 may change the recognition flag value into TRUE and determine the recognition index value, then return to operation 410 for detecting handwriting input and receive the user's handwriting input.

According to various embodiments, if the recognition flag value is TRUE (yes in 440), the electronic device 101 may extract all strokes from the recognition index value to the current stroke in operation 460. For example, the electronic device may extract all strokes handwriting entered after the first keyword.

According to various embodiments, in operation 461, the electronic device 101 may perform character recognition on the extracted strokes. The electronic device 101 may output the text obtained via character recognition as a non-position-fixed hashtag in operation 462. For example, the electronic device 101 may display the hashtag in the preset region on the screen. According to various embodiments, the content may be in the state of being displayed on the screen, and the hashtag may be displayed in a preset region on the content.

In the above description, the non-position-fixed hashtag and the position-fixed hashtag are shown to be distinctively output. However, in an actual implementation, they may be displayed in order of creation of hashtags in the region for displaying a hashtag on the screen regardless of handwriting input positions.

Figure 5:
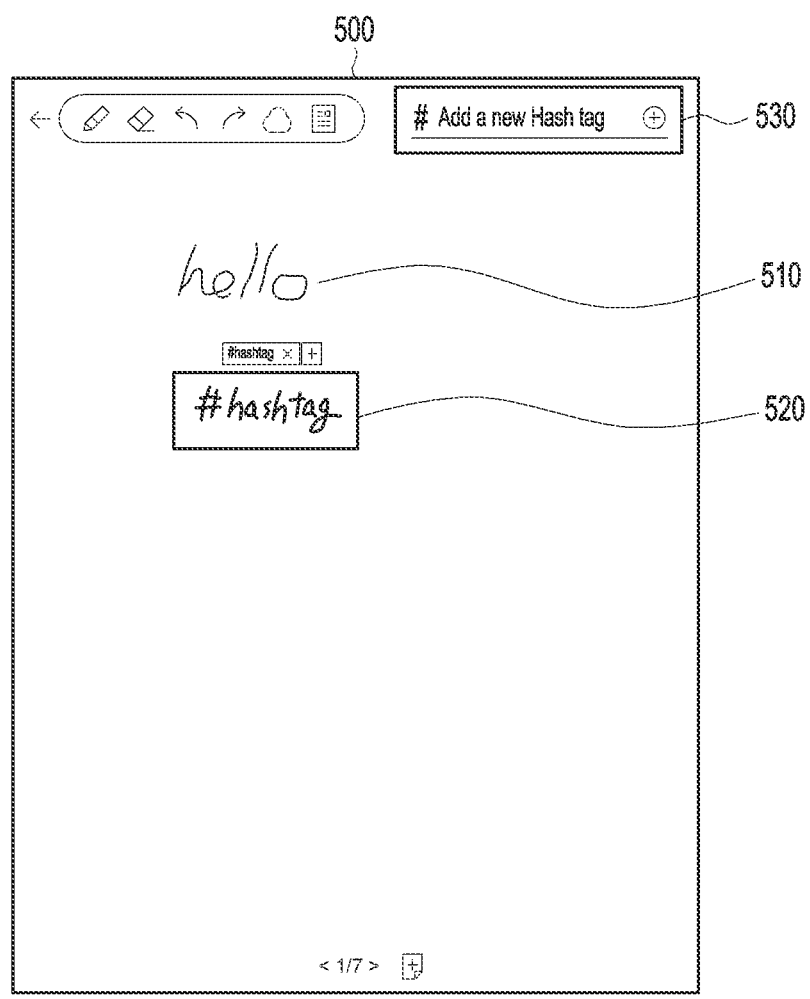
FIG. 5 is a view illustrating the position of handwriting input for hashtag input according to an embodiment of the disclosure.

FIG. 5 is a view illustrating various embodiments of the position of handwriting input for hashtag input according to an embodiment of the disclosure.

Referring to FIG. 5, the electronic device 101 may display content 500. According to various embodiments, although FIG. 5 illustrates that content 500 is an application screen for memo input, the content 500 may be implemented as a screen corresponding to a photo or video as described above.

According to various embodiments, based on a handwriting input using at least one of a stylus pen or finger touch sensed by the sensing panel 220, the electronic device 101 may display an object 510 corresponding to the handwriting input on the content 500. According to various embodiments, the electronic device 101 may perform character recognition not on the entire for example, but on only some strokes for first keyword recognition.

According to various embodiments, upon receiving a handwriting input including the first keyword for hashtag input, the electronic device 101 may display the object 520 corresponding to the handwriting input including the first keyword. For example, in the embodiment of FIG. 5, an object 520 composed of the first keyword indicating "#" and an additional handwriting input of "hashtag" may be displayed according to the user's handwriting input. The electronic device 101 may perform character recognition on the handwriting input (e.g., the additional handwriting input indicating the text of "hashtag" of FIG. 5) received after the first keyword (e.g., "#" of FIG. 5) and provide the text obtained by character recognition, as a hashtag for the displayed content. According to various embodiments, the operation of providing as a hashtag may include at least one of the operation of associating and storing the text obtained by character recognition and the displayed content or the operation of displaying the text obtained by character recognition in some region of the displayed content.

According to various embodiments, the electronic device 101 may perform character recognition on the entire handwriting input after the first keyword is recognized and until before a character recognition end event is identified. For example, the character recognition end event may be when a blank with a preset size or more is identified or no handwriting input is entered for a preset time or longer.

According to various embodiments, the content 500 may include a preset region 530 for hashtag input. If a handwriting input is received in the preset region 530 for hashtag input, the electronic device 101 may display the object corresponding to the handwriting input. According to various embodiments, although the first keyword is not included in the handwriting input, the electronic device 101 may perform character recognition on the received handwriting input and provide the text obtained by character recognition, as a hashtag for the content.

According to various embodiments, the user may enter a handwriting in the preset region 530 for hashtag input in the content 500 or handwriting-enter the first keyword in any region, thereby entering a hashtag.

Figure 6A:
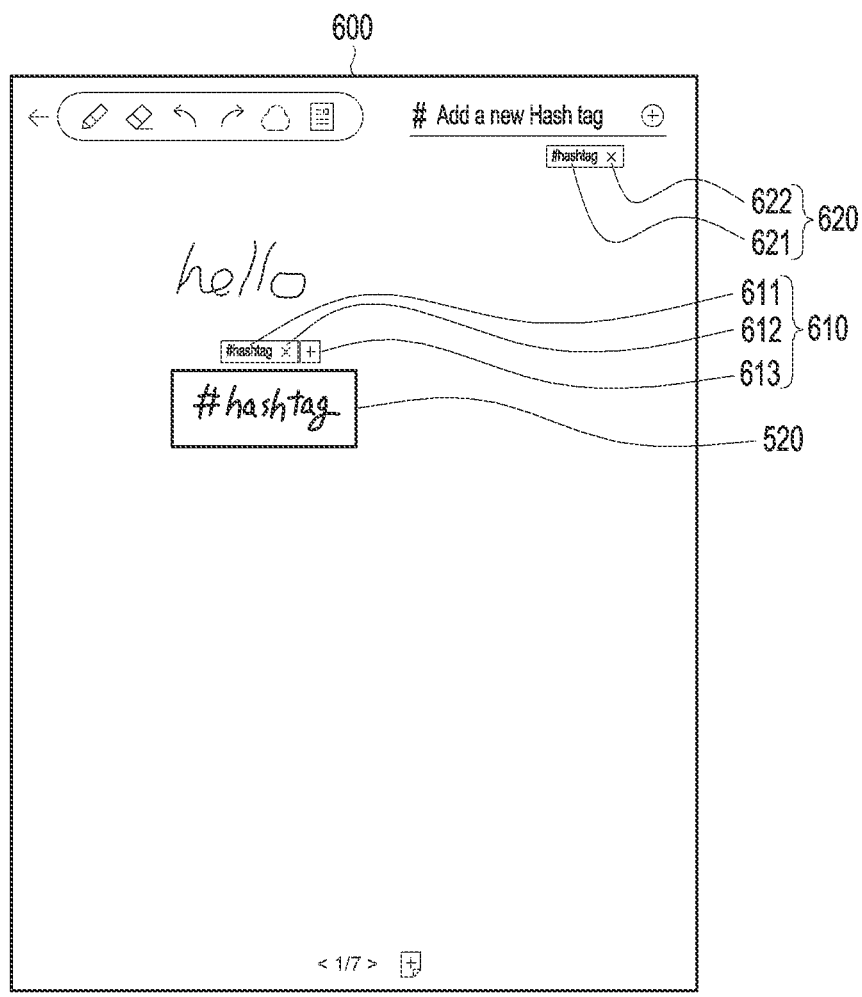
FIG. 6A is a view illustrating an embodiment of displaying a hashtag generated based on handwriting input, according to an embodiment of the disclosure.

FIG. 6A is a view illustrating an embodiment of displaying a hashtag generated based on handwriting input, according to an embodiment of the disclosure.

According to various embodiments, the electronic device 101 may display content 600. According to various embodiments, although FIG. 6A illustrates that content 600 is an application screen for memo input, the content 600 may be implemented as a screen corresponding to a photo or video as described above.

According to various embodiments, based on a handwriting input using at least one of a stylus pen or finger touch sensed by the sensing panel 220, the electronic device 101 may display an object corresponding to the handwriting input on the content 600.

According to various embodiments, upon receiving a handwriting input including the first keyword for hashtag input, the electronic device 101 may display the object 520 corresponding to the handwriting input including the first keyword. The electronic device 101 may perform character recognition on the handwriting input received after the first keyword and provide the text obtained by character recognition, as a hashtag for the displayed content 600. According to various embodiments, the electronic device 101 may perform character recognition on the entire handwriting input after the first keyword is recognized and until before a character recognition end event is identified. For example, the character recognition end event may be when a blank with a preset size or more is identified or no handwriting input is entered for a preset time or longer.

According to various embodiments, the electronic device 101 may display a user interface 610 for receiving an identification as to whether to provide, as a hashtag, the characters recognized after the first keyword is recognized and until before a character recognition end event is identified. The user interface 610 for receiving an identification as to whether to provide as a hashtag may include a text 611 obtained by character recognition, a delete button 612, and a create hashtag button 613.

According to various embodiments, the text 611 obtained by character recognition, included in the user interface 610 for receiving an identification as to whether to provide as a hashtag may be displayed after character recognition is complete, from recognition of the first keyword to identification of a character recognition end event. In another embodiment, the text 611 obtained by character recognition may be displayed in real-time if character recognition is performed in real-time according to handwriting input. For example, after '#h' is displayed, the text 611 obtained by character recognition may be sequentially displayed, like '#ha', '#has', and '#hash,' according to the display of object corresponding to the handwriting input and then '#hashtag' may be displayed finally.

According to various embodiments, if the delete button 612 is selected, the user interface 610 for receiving an identification as to whether to provide as a hashtag may be deleted out. In another embodiment, the handwriting input 520 including the first keyword may be configured to be deleted along with the user interface 610 for receiving an identification as to whether to provide as a hashtag. Thus, unnecessary creation of a hashtag may be prevented via the delete button 612 when the user does not desire to create the text obtained by character recognition on the handwriting input as a hashtag or when the result of character recognition on the handwriting input differs from what has been intended.

According to various embodiments, if the create hashtag button 613 is selected, the electronic device 101 may display the hashtag 620 in the preset region for displaying hashtag on the content screen 600. The hashtag 620 displayed on the content 600 may include the text 621 obtained by character recognition and a delete button 622.

According to various embodiments, if the create hashtag button 613 is selected, the hashtag 620 may be displayed in the preset region for displaying a hashtag, and the user interface 610 for receiving an identification as to whether to provide as a hashtag may be deleted.

According to various embodiments, if the create hashtag button 613 is selected, the hashtag 620 may be displayed in the preset region for displaying a hashtag, and the object 520 corresponding to the handwriting input including the first keyword may be maintained. As necessary, the object 520 corresponding to the first keyword-containing handwriting input may be configured to be deleted when the create hashtag button 613 is selected.

Meanwhile, according to various embodiments, the electronic device 101 may manage the object 520 corresponding to the first keyword-containing handwriting input as the object corresponding to the hashtag 620.

Figure 6B:
FIG. 6B is a view illustrating an embodiment in which a handwriting input is deleted when a hashtag is deleted, according to an embodiment of the disclosure.

FIG. 6B is a view illustrating an embodiment in which a handwriting input is deleted when a hashtag is deleted, according to an embodiment of the disclosure.

Referring to FIG. 6B, if the delete button 622 for deleting the hashtag 620 is selected, the electronic device 101 may delete the object 520 corresponding to the first keyword-containing handwriting input while deleting the hashtag 620. In this case, only objects corresponding to handwriting entries which are irrelevant to the hashtag may be displayed on the content 600. According to the above-described embodiment, a hashtag and an object corresponding to a handwriting input used upon generating the hashtag may be associated and managed, and user convenience may be enhanced.

Figure 7A:
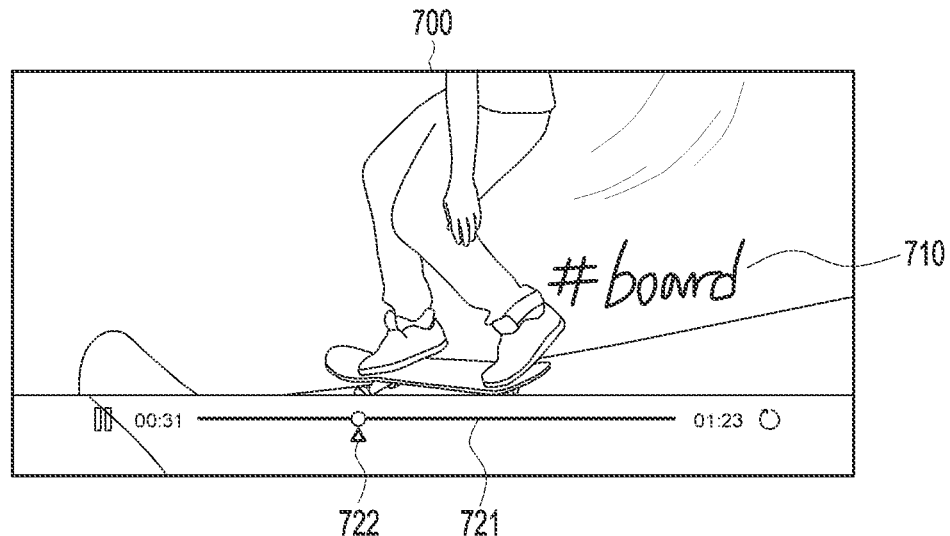
FIG. 7A is a view illustrating an embodiment in which handwriting input is performed on a video, according to an embodiment of the disclosure.

FIG. 7A is a view illustrating an embodiment in which handwriting input is performed on a video, according to an embodiment of the disclosure.

According to various embodiments, the electronic device 101 may display content 700 which is a video. According to various embodiments, the content 700 may further include a user interface 721 indicating the progress status of the video and a user interface 722 indicating the current time at which the video is played.

Referring to FIG. 7A, the content 700, as a video, may have an overall run time of one minute and 23 seconds and may be currently being played at 31 seconds after the start of the video. In another embodiment, the user interface 721 indicating the progress status of the video may display the time remaining after the video is in progress.

According to various embodiments, if a handwriting input is sensed by the sensing panel 220 while the video is being played, the electronic device 101 may display the object 710 corresponding to the handwriting input.

According to various embodiments, upon recognizing a first keyword for hashtag input by at least part of the handwriting input, the electronic device 101 may identify the frame displayed at the time when the first keyword is recognized. The electronic device 101 may perform character recognition on an additional handwriting input received after the first keyword and provide information about the identified frame and the text obtained by character recognition, as a hashtag for the playing content 700. According to various embodiments, providing as a hashtag may include at least one of the operation of associating and storing the playing content, obtained text, and information about the identified frame and the operation of displaying the obtained text.

Figure 7B:
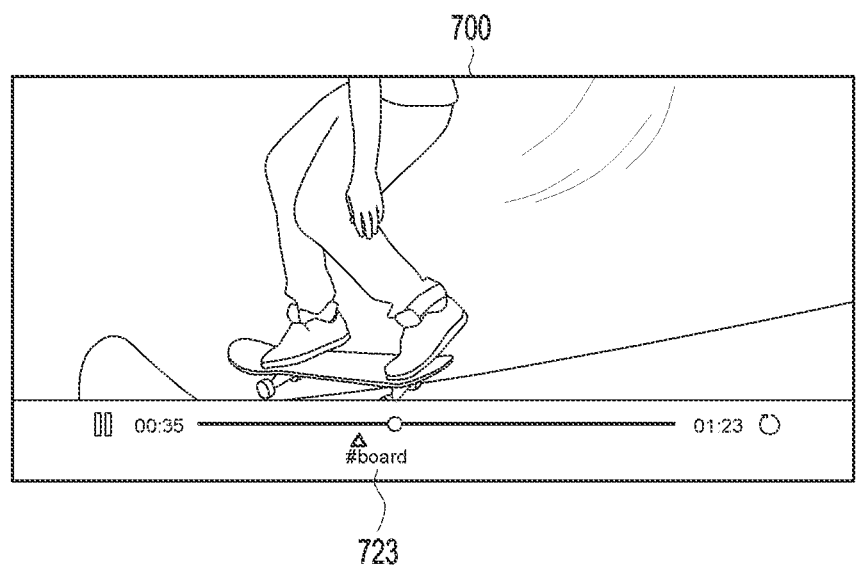
FIG. 7B is a view illustrating an embodiment in which a hashtag is displayed according to the input of FIG. 7A according to an embodiment of the disclosure.

FIG. 7B is a view illustrating an embodiment in which a hashtag is displayed according to the input of FIG. 7A according to an embodiment of the disclosure.

Referring to FIG. 7B, the electronic device 101 may display a user interface 723 including the obtained text in the region corresponding to the time when the first keyword is recognized on the user interface 721 indicating the progress status of the video. According to various embodiments, the electronic device 101 may identify the region corresponding to the time when the first keyword is recognized using the information about the identified frame.

According to various embodiments, the electronic device 101 may delete the object corresponding to the handwriting input if displaying the user interface 723 including the obtained text in the region corresponding to the time when the first keyword is recognized on the user interface 721 indicating the progress status of the video.

According to various embodiments, if the user interface 723 including the obtained text, displayed in the region corresponding to the time when the first keyword is recognized, is selected, the electronic device 101 may display from the frame at the time when the first keyword is recognized.

According to the above-described embodiment, as a hashtag is provided based on a handwriting input received while a video is played, a video search and A-B repeat on the video are performed easily, contributing to user convenience.

Figure 8:
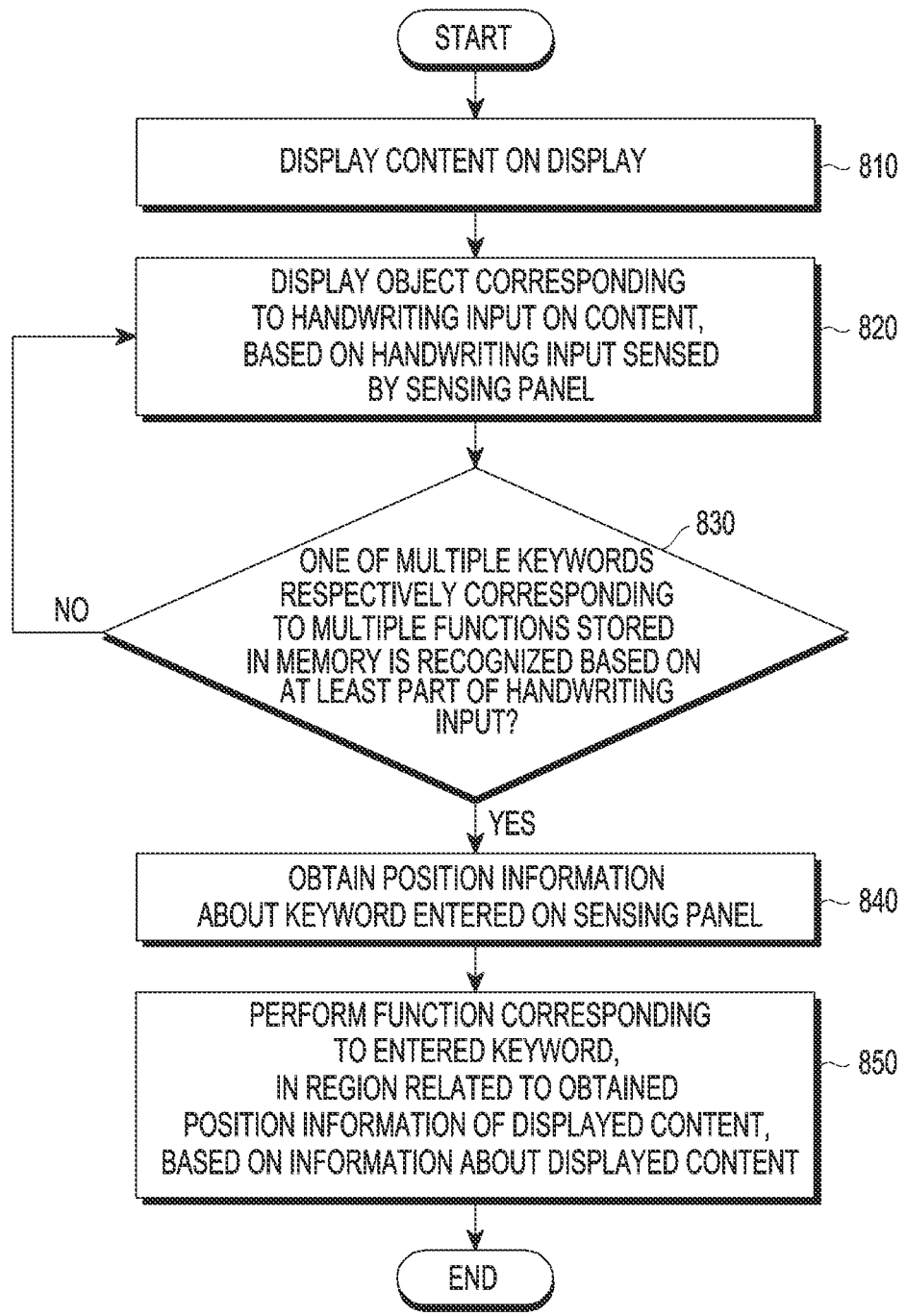
FIG. 8 is a flowchart illustrating a method of controlling an electronic device according to an embodiment of the disclosure.

FIG. 8 is a flowchart illustrating a method of controlling an electronic device according to an embodiment of the disclosure.

According to various embodiments, the electronic device 101 (e.g., at least one processor (e.g., the processor 230)) may display content on the display 210 in operation 810. For example, the displayed content may be at least one of a text document, an application for creating a text document, a photo, a picture, and a video.

According to various embodiments, based on a handwriting input sensed by the sensing panel 220 after the content is displayed, the processor 101 may display an object corresponding to the handwriting input on the content in operation 820. For example, the handwriting input may be performed by at least one of a stylus pen or finger touch. According to various embodiments, the object corresponding to the handwriting input may be a visualized touch trajectory of at least one of a pen or finger on the sensing panel 220.

According to various embodiments, in operation 830, the electronic device 101 may determine whether one of a plurality of keywords individually corresponding to a plurality of functions stored in the memory 240 is recognized based on at least part of the handwriting input. According to various embodiments, the electronic device 101 may recognize a preset number of strokes entered recently of the handwriting input and determine whether the entered handwriting is one of the plurality of keywords. For example, the preset number may be the largest number of strokes of the plurality of keywords.

According to various embodiments, the electronic device 101 may character-recognize a preset number of strokes entered recently and determine whether the entered handwriting is one of the plurality of keywords. For example, the electronic device 101 may perform character recognition on the preset number of strokes entered recently, via OCR.

According to another embodiment, the electronic device 101 may image-recognize a preset number of strokes entered recently and determine whether the entered handwriting is one of the plurality of keywords. If the electronic device 101 recognizes the entered handwriting via image recognition, the electronic device 101 may compare an image composed of a preset number of strokes with a plurality of pre-stored images corresponding to each of the plurality of keywords, thereby determining whether the strokes are one of the plurality of keywords. For example, the electronic device 101 may compare the image composed of the preset number of strokes with each of the plurality of pre-stored images corresponding to each of the plurality of keywords, thereby obtaining a similarity per image. The electronic device 101 may determine that the keyword included in the image composed of the preset number of strokes is the keyword included in the image, for which the average of the obtained similarities is the highest and is not less than a preset value, among the plurality of preset images. Or, the electronic device 101 may store a classification model trained based on a handwriting image database for a plurality of first keywords, enter the image composed of the preset number of strokes to the classification model, and identify whether the keyword is recognized based on the result of output from the classification model. This is merely an example, and various schemes for recognizing an object included in an image may be used.

According to various embodiments, if no keyword of the plurality of pre-stored keywords is recognized from the handwriting input (no in 830), the electronic device 101 may repeat operation 820 of displaying the object corresponding to the handwriting input on the content.

Meanwhile, if one of the plurality of keywords is recognized based on at least part of the handwriting input (yes in 830), the electronic device 101 may obtain position information about the keyword entered on the sensing panel 220 in operation 840. The electronic device 101 may detect, e.g., a pressure, capacitance, or induced magnetic field generated from the sensing panel 220 based on a touch on the sensing panel 220 by at least one of the stylus pen or finger. The electronic device 101 may detect the position of the pressure, capacitance, or induced magnetic field generated by the touch on the sensing panel 220, thereby obtaining position information about the touch input. For example, the position information may be coordinates or a set of coordinates on the sensing panel 220.

According to various embodiments, the electronic device 101 may perform the function corresponding to the entered keyword in the region related to the obtained position information about the displayed content, based on information about the displayed content in operation 850.

According to various embodiments, if the entered keyword is a keyword for hashtag input, the electronic device 101 may display at least one recommendation hashtag around the position where the keyword has been entered. According to various embodiments, if the displayed content is an application for creating a text document, e.g., a memo, the recommendation hashtag may include at least one hashtag related to at least one text document pre-stored in the memory. For example, the electronic device 101 may recommend a hashtag used in a text document similar to the text document being currently created among a plurality of pre-stored text documents, as a hashtag of the text document being currently created. According to various embodiments, the similar text document may mean a text document which has a similar appearance pattern of words recognized from a page. To that end, the electronic device 101 may character-recognize, in real-time, the text document being created by handwriting input or, if a keyword for hashtag input is recognized, perform character recognition on the handwriting input before the keyword is entered.

In another embodiment, the electronic device 101 may recommend a hashtag which the user has already used. For example, the electronic device 101 may recommend a hashtag, which used to be frequently used, based on the frequencies of the hashtags which the user has used.

Figure 9:
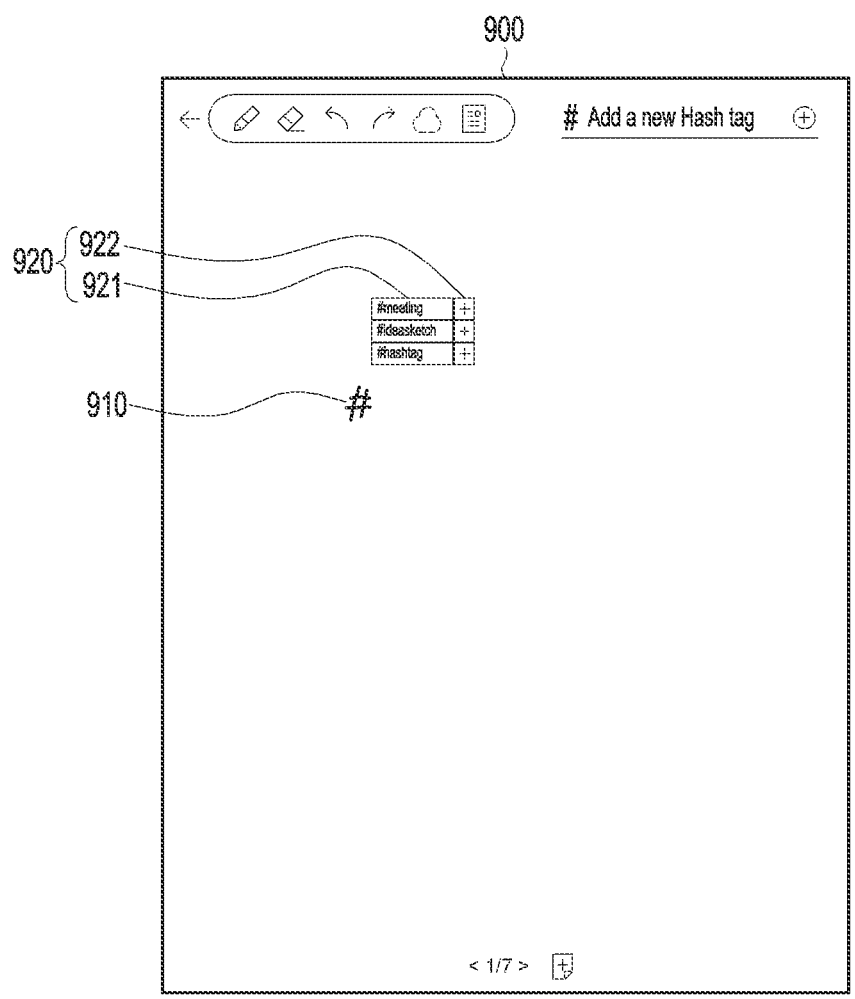
FIG. 9 is a view illustrating a hashtag recommendation operation according to an embodiment of the disclosure.

FIG. 9 is a view illustrating a hashtag recommendation operation according to an embodiment of the disclosure.

According to various embodiments, in a case where the displayed content 900 is an application for creating a text document, e.g., memo, as shown in FIG. 9, if a keyword 910 (e.g., #) for hashtag input is entered based on at least part of the handwriting input, the electronic device 101 may display a user interface 920 for recommending at least one hashtag.

According to various embodiments, the user interface 920 for recommending hashtag may include a text 921 of the recommendation hashtag and a create hashtag button 922 for creating as a hashtag among recommended hashtags.

According to various embodiments, the recommended hashtag may be at least one of a hashtag frequently used by the user or a hashtag used in a text document similar to the text document being created.

According to various embodiments, if the user selects one of at least one recommended hashtag, the electronic device may display the selected hashtag in a preset region for displaying hashtags, of the displayed content 900. According to various embodiments, if one or more hashtags among a plurality of recommended hashtags are continuously selected, the electronic device 101 may provide the one or more selected hashtags as hashtags of the displayed content 900.

According to various embodiments, if the displayed content is a photo, picture, or such an image or a video, the electronic device 101 may recognize an object in the handwriting-entered region on the content based on the obtained position information. According to various embodiments, the electronic device 101 may obtain information about the object including, e.g., the kind and name of the object in the handwriting-entered region on the content, via image analysis. According to various embodiments, if the displayed content is a video, the electronic device 101 may recognize an object included in the region where a keyword for hashtag input is recognized on the frame displayed at the time of recognition of the keyword.

According to various embodiments, in a case where the displayed content 1000 is a screen corresponding to a photo, picture or such an image or a video, as shown in FIG. 10, if a keyword 1010 (e.g., #) for hashtag input is entered based on at least part of the handwriting input, the electronic device 101 may display a user interface 1020 for recommending at least one hashtag. According to various embodiments, the user interface 1020 for recommending hashtag may include a text of the recommendation hashtag and a create hashtag button for creating as a hashtag among recommended hashtags.

According to various embodiments, if the object included in the region where the keyword for hashtag input has been entered is a human figure, and information about the human figure is previously stored, the electronic device 101 may provide the name of the human figure as a recommendation hashtag. Or, according to various embodiments, if the object included in the region where the keyword for hashtag input has been entered is a thing, the electronic device 101 may provide the name of the thing obtained as a result of object recognition as a recommendation hashtag. Although FIG. 10 illustrates that the human name only, '#KevinKim', is recommended on the user interface 1020 for recommending a hashtag, '#T-shirt' or the brand of the t-shirt, not '#KevinKim' alone, may be recommended as a hashtag.

FIG. 11 is a view illustrating a plurality of contents classified based on a hashtag, according to an embodiment of the disclosure.

According to the various embodiments described above, the electronic device 101 may classify and store a plurality of contents based on the hashtag entered in each content, thereby facilitating a classification, search, or organization of contents. For example, the electronic device 101 may classify and store hashtag-created contents per hashtag as shown in FIG. 11 and provide the classified contents to the user. According to various embodiments, the electronic device 101 may display contents based on the order of creation of the contents per hashtag. For example, the contents classified per hashtag may be various types of files, such as documents, photos, and videos. According to various embodiments, the displayed hashtags may be listed according to the options provided, e.g., in order of syllables, in order of last update of pages, in order of first creation of pages, in ascending order, or in descending order.

According to various embodiments, if '#CES' and '#Allhands' both are created as hashtags in content A, classification may be performed so that content A is included both in the content classified as #CES and in the content classified as #Allhands.

FIG. 12 is a view illustrating an embodiment of searching for content using a hashtag, according to an embodiment of the disclosure.

According to various embodiments, the electronic device 101 may more easily search for desired content by searching for a hashtag. For example, as shown in FIG. 12, if the user searches for 'idea' via a hashtag search, the electronic device 101 may obtain '#idea' and '#ideasketch' which are hashtags including 'idea' among a plurality of stored hashtags and provide only contents classified as '#idea' and '#ideasketch.'

As described above, as a hashtag is stored via handwriting input on each content, the electronic device may classify contents based on hashtags and may easily search for a desired content among a plurality of stored contents via a hashtag search. According to various embodiments, a desired content may be more easily searched for by entering a plurality of hashtags as keywords and searching for content including all of the plurality of hashtags.

Meanwhile, it is also possible to enter a keyword for performing other functions as well as a keyword for hashtag input via handwriting input. This is described below in greater detail with reference to FIGS. 13 to 15.

Figure 13:
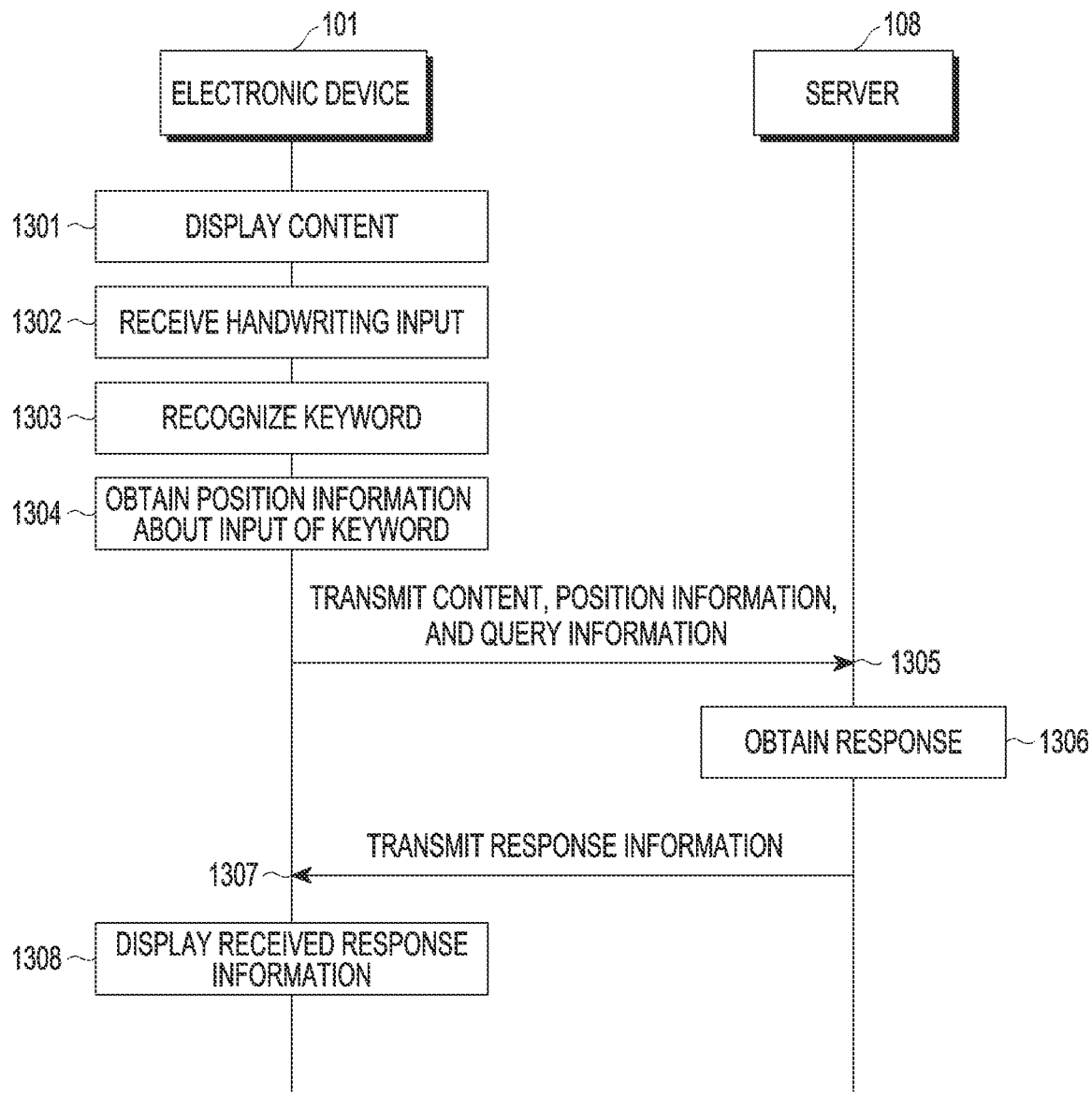
FIG. 13 is a sequence diagram illustrating the operation of receiving a response to a handwriting input from an external server and providing the response, according to an embodiment of the disclosure.

FIG. 13 is a sequence diagram illustrating the operation of receiving a response to a handwriting input from an external server and providing the response, according to an embodiment of the disclosure.

According to various embodiments, the electronic device 101 (e.g., the processor 230) may display content in operation 1301. For example, the displayed content may be at least one of a text document, an application for creating a text document, a photo, a picture, and a video.

According to various embodiments, the electronic device 101 may receive a handwriting input sensed by the sensing panel 220 after displaying the content in operation 1302. According to various embodiments, based on the sensed handwriting input, the electronic device 101 may display an object corresponding to the handwriting input on the content. For example, the handwriting input may be performed by at least one of a stylus pen or finger touch. According to various embodiments, the object corresponding to the handwriting input may be a visualized touch trajectory of at least one of a pen or finger on the sensing panel 220.

According to various embodiments, the electronic device 101 may recognize a keyword related to a function during handwriting input in operation 1303. According to various embodiments, the function may be one that may be performed by the electronic device 101, and a plurality of functions may individually correspond to a plurality of keywords and be stored in the memory 240. For example, the keyword for hashtag input may be '#,' the keyword for searching for information about the recognized object may be '?,' and the keyword for linking to the site for purchasing the recognized object may be '$.' Such a relationship between function and keyword is merely an example and may be modified according to the settings of the manufacturer of the electronic device 101 or the user's settings.

According to various embodiments, upon recognizing the function-related keyword during handwriting input, the electronic device 101 may obtain position information about input of the keyword in operation 1304. The electronic device may detect, e.g., a pressure, capacitance, or induced magnetic field generated from the sensing panel 220 based on a touch on the sensing panel 220 by at least one of the stylus pen or finger. The electronic device 101 may detect the position of the pressure, capacitance, or induced magnetic field generated by the touch on the sensing panel 220, thereby obtaining position information about the touch input. For example, the position information may be coordinates or a set of coordinates on the sensing panel 220.

According to various embodiments, in operation 1305, the electronic device 101 may transmit content data, obtained position information, and query information corresponding to the recognized keyword to the server 108. For example, if the recognized keyword is '?,' the electronic device 101 may identify an information search query corresponding to the keyword '?' and transmit the content data, obtained position information, and query information for the identified information search to the server 108. As another example, if the recognized keyword is '$,' the electronic device 101 may identify a purchase site link query corresponding to the keyword '$' and transmit the content data, obtained position information, and query information for the identified purchase site link to the server 108.

Meanwhile, although FIG. 13 illustrates that the content data and obtained position information are transmitted so that the server 108 performs the operation of recognizing an object included in the keyword-entered region, in an actual implementation, the electronic device 101 may recognize the object included in the keyword-entered region and transmit only the result of recognition, along with the query information, to the server 108.

According to various embodiments, the server 108 may obtain a response based on the received content data, position information, and query information in operation 1306. According to various embodiments, the server 108 may recognize the object included in the region corresponding to the position information on the content based on the content data and position information. According to an embodiment, the object recognition result may be received from the electronic device 101.

According to various embodiments, the server 108 may obtain a response based on information about the recognized object and the query information received from the electronic device 101. For example, if the query information concerns an information search, the server 108 may obtain information obtained by searching for the recognized object, as a response. In another example, if the query information regards a purchase site link, the server 108 may obtain a site address link, where the recognized object may be purchased, as a response.

According to various embodiments, the server 108 may transmit information about the obtained response to the electronic device 101 in operation 1307. The electronic device 101 may display the received response information in operation 1308.

Figure 14:
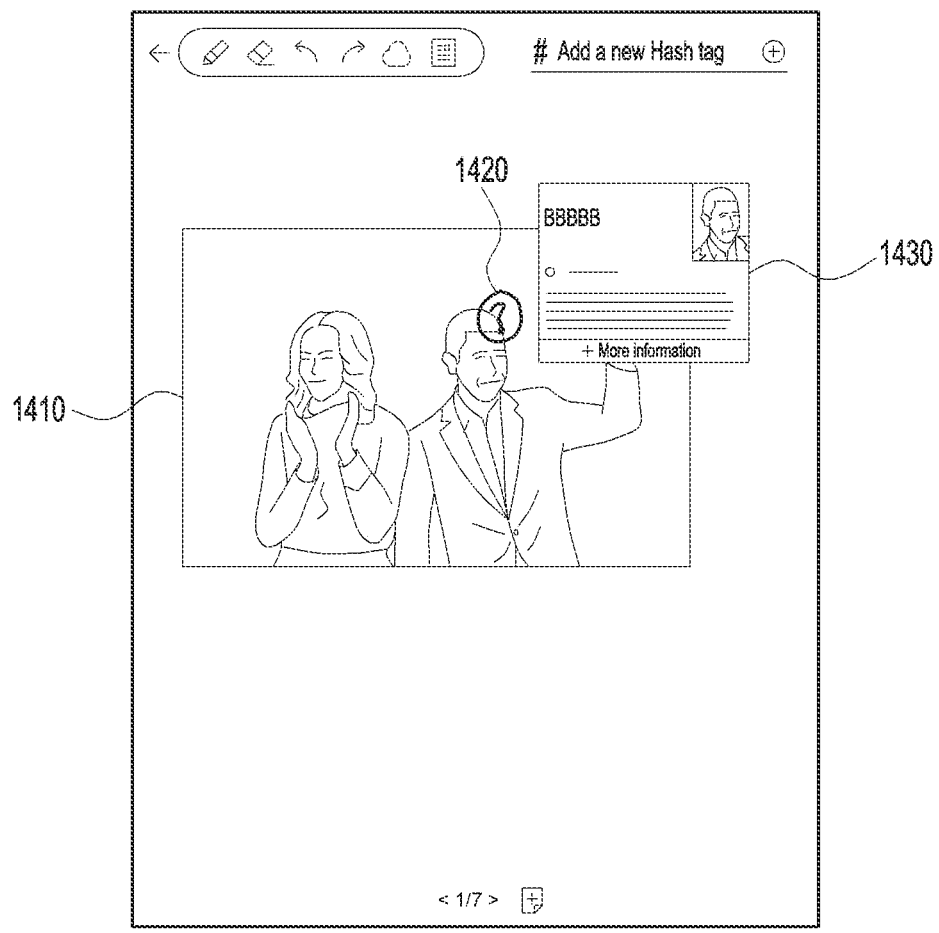
FIG. 14 is a view illustrating an object search operation by handwriting input, according to an embodiment of the disclosure.

FIG. 14 is a view illustrating an object search operation by handwriting input, according to an embodiment of the disclosure.

For example, if the displayed content 1410 is an image, e.g., a photo or picture, and a keyword entered by handwriting input is the keyword '?' 1420 related to an information search as shown in FIG. 14, the electronic device 101 may obtain position information about input of the keyword 1420 on the displayed content 1410. According to various embodiments, the electronic device 101 may transmit the content data, obtained position information, and information search query corresponding to the recognized keyword '?' to an external server and display a search result 1430 for an object recognized, which is response information received from the external server.

According to various embodiments, the electronic device 101 may associate the object recognition result or information search result with the displayed content and store them, thus facilitating a content search.

Figure 15:
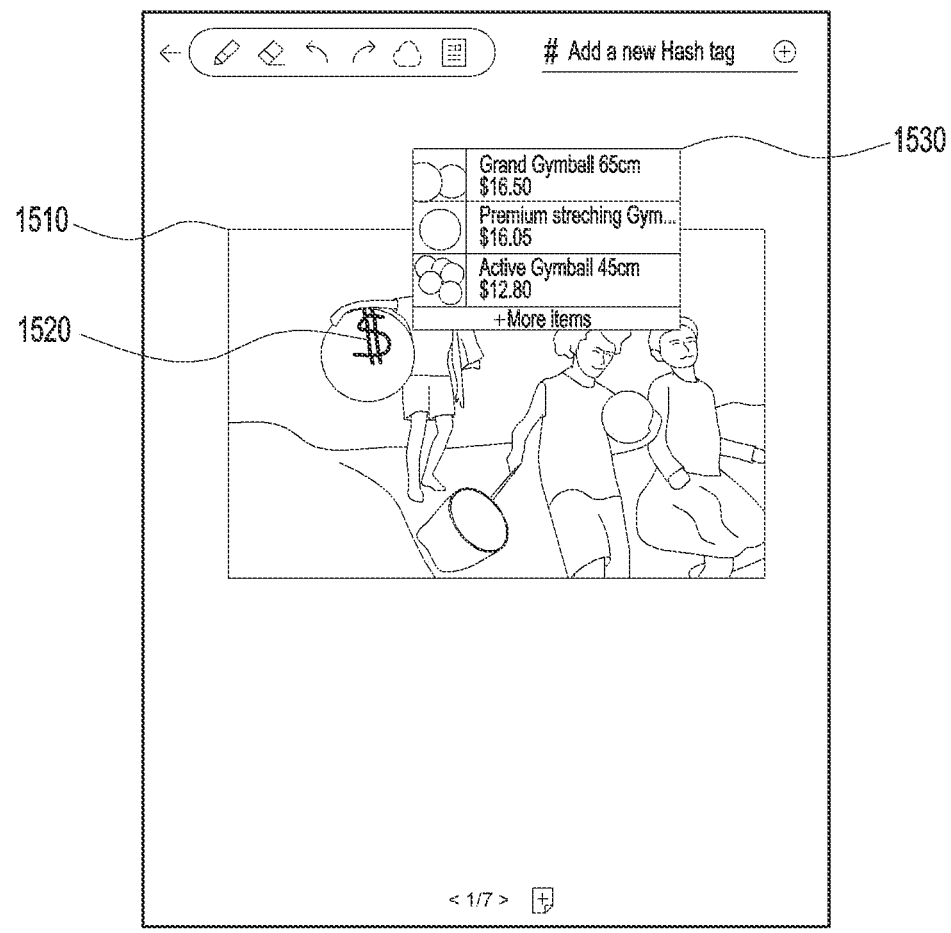
FIG. 15 is a view illustrating the operation of displaying a purchase site by handwriting input, according to an embodiment of the disclosure.

FIG. 15 is a view illustrating the operation of displaying a purchase site by handwriting input, according to an embodiment of the disclosure.

As another example, if the displayed content 1510 is an image, e.g., a photo or picture, and a keyword entered by handwriting input is the keyword '$' 1520 related to a purchase site link as shown in FIG. 15, the electronic device 101 may obtain position information about input of the keyword 1520 on the displayed content 1510. According to various embodiments, the electronic device 101 may transmit the content data, obtained position information, and information search query corresponding to the recognized keyword '$' to an external server and display a purchase site link 1530 of an object recognized, which is response information received from the external server.

According to various embodiments, the electronic device 101 may associate the object recognition result or purchase site link with the displayed content and store them, thus facilitating a content search.

According to the above-described various embodiments, although all of the functions of the electronic device 101 are not displayed as buttons on the screen, various functions may be performed via handwriting input. Further, contents classification and search may be more easily performed by entering a hashtag via handwriting input.

An Example 1 of the disclosure may be an electronic device, wherein the electronic device may include a display, a sensing panel and a processor operatively connected with the display and the sensing panel, wherein the processor is configured to display content on the display, display an object corresponding to a handwriting input on the content, based on the handwriting input sensed by the sensing panel, in response to a first keyword being recognized based on at least part of the handwriting input, perform character recognition on an additional handwriting input entered after the first keyword, and in response to a character recognition end event being identified, provide text obtained by the character recognition on the additional handwriting input as a hashtag for the displayed content.

An Example 2 may be an electronic device in accordance with example 1, or with any other example described herein, wherein the processor is configured to perform character recognition of a preset number of strokes entered recently of the handwriting input and, based on the preset number of character-recognized strokes corresponding to the first keyword, perform character recognition on a handwriting input made after the first keyword is entered and until before the character recognition end event is identified, and wherein the preset number is a number of strokes of the first keyword.

An Example 3 may be an electronic device in accordance with example 1 or example 2, or with any other example described herein, wherein the character recognition end event includes identifying that the additional handwriting input includes a blank with a preset size or identifying that no handwriting input is entered for a preset time or longer.

An Example 4 may be an electronic device in accordance with example 1 to example 3, or with any other example described herein, wherein the displayed content further includes a preset region for hashtag input, and wherein the processor is configured to, in response to determining that another handwriting input is entered in the preset region based on position information about handwriting input on the display, perform character recognition on the another handwriting input made in the preset region and provide text obtained by the character recognition on the another handwriting input as a hashtag for the content.

An Example 5 may be an electronic device in accordance with example 1 to example 4, or with any other example described herein, wherein the processor is configured to control the display to display the hashtag in a preset region for displaying a hashtag in the displayed content.

An Example 6 may be an electronic device in accordance with example 1 to example 5, or with any other example described herein, wherein the processor is configured to, in response to an input for deleting the displayed hashtag being entered, delete the displayed hashtag and delete an object corresponding to the hashtag among a plurality of objects displayed on the content.

An Example 7 may be an electronic device in accordance with example 1 to example 6, or with any other example described herein, wherein the processor is configured to, based on the content being a video, identify a frame displayed at a time when the first keyword is recognized among a plurality of frames included in the video and provide text obtained by character recognition of an additional handwriting input made after input of the first keyword and information about the identified frame, as a hashtag for the displayed content.

An Example 8 may be an electronic device in accordance with example 1 to example 7, or with any other example described herein, wherein the processor is configured to display a first user interface for indicating a progress status of the video and, display a second user interface including the obtained text in a region corresponding to a time when the first keyword is recognized on the first user interface, and in response to an input for selecting the second user interface being entered, display from a frame at the time when the first keyword is recognized.

An Example 9 of disclosure may be a method of controlling an electronic device, the method may include displaying content on a display, displaying an object corresponding to a handwriting input on the content, based on the handwriting input sensed by a sensing panel, in response to a first keyword being recognized based on at least part of the handwriting input, performing character recognition on an additional handwriting input entered after the first keyword, and in response to a character recognition end event being identified, providing text obtained by the character recognition on the additional handwriting input as a hashtag for the content.

An Example 10 may be a method in accordance with example 9, or with any other example described herein, wherein performing the character recognition includes performing character recognition of a preset number of strokes entered recently of the handwriting input and, based on the preset number of character-recognized strokes corresponding to the first keyword, performing character recognition on a handwriting input made after the first keyword is entered and until before the character recognition end event is identified, and wherein the preset number is a number of strokes of the first keyword.

An Example 11 may be a method in accordance with example 9 or example 10, or with any other example described herein, wherein the character recognition end event includes identifying that the additional handwriting input includes a blank with a preset size or identifying that no handwriting input is entered for a preset time or longer.

An Example 12 may be a method in accordance with example 9 to example 11, or with any other example described herein, further comprising displaying the hashtag in a preset region for displaying a hashtag in the displayed content.

An Example 13 may be a method in accordance with example 9 to example 12, or with any other example described herein, wherein providing as the hashtag for the displayed content includes, based on the content being a video, identifying a frame displayed at a time when the first keyword is recognized among a plurality of frames included in the video and providing text obtained by character recognition of an additional handwriting input made after input of the first keyword and information about the identified frame, as the hashtag for the displayed content.

An Example 14 may be a method in accordance with example 9 to example 13, or with any other example described herein, wherein providing as the hashtag for the displayed content further includes: displaying a first user interface for indicating a progress status of the video and, displaying a second user interface including the obtained text in a region corresponding to a time when the first keyword is recognized on the first user interface and in response to an input of selecting the second user interface being entered, displaying from a frame at the time when the first keyword is recognized.

An Example 15 of the disclosure may be an electronic device, wherein the electronic device may include a display, a sensing panel, a memory, and a processor operatively connected with the display, the sensing panel, and the memory, wherein the processor is configured to display content on the display, display an object, on the content, corresponding to a handwriting input, based on the handwriting input sensed by the sensing panel, in response to one of a plurality of keywords, respectively corresponding to a plurality of functions stored in the memory, being recognized based on at least part of the handwriting input, obtain position information about the keyword entered on the sensing panel, and perform a function corresponding to the entered keyword for a region related to the obtained position information of the displayed content based on information about the displayed content.

An Example 16 may be an electronic device in accordance with example 15, or with any other example described herein, wherein the processor is configured to in response to recognizing a first keyword for hashtag input being recognized, display at least one recommendation hashtag in a position where the first keyword is entered and in response to one of the at least one recommendation hashtag is selected, provide the selected hashtag as a hashtag for the displayed content.

An Example 17 may be an electronic device in accordance with example 15 or example 16, or with any other example described herein, wherein based on the displayed content being an application for creating a text document, the recommendation hashtag includes at least one hashtag related to at least one text document previously stored in the memory.

An Example 18 may be an electronic device in accordance with example 15 to example 17, or with any other example described herein, wherein based on the displayed content being a photo or a video, the processor is configured to recognize an object included in the region related to the obtained position information of the displayed content and recommend a result of the recognition as the hashtag for the displayed content.

An Example 19 may be an electronic device in accordance with example 15 to example 18, or with any other example described herein, further comprising a communication module, wherein the processor is configured to in response to a second keyword different from the first keyword being entered, transmit the displayed content, the obtained position information, and query information for performing a function corresponding to the entered second keyword to an external server via the communication module and control the display to display response information received from the external server in the region related to the obtained position information of the displayed content.

An Example 20 may be an electronic device in accordance with example 15 to example 19, or with any other example described herein, wherein the query information is information for displaying a purchase site or an information search for an object included in the region related to the obtained position information.

An Example 21 of the disclosure may be an electronic device, wherein the electronic device may include a display means (e.g. a display, etc.), a sensing means (e.g. a sensing panel, etc.) and a control means (e.g. a processor, a controller, a control circuitry, etc.) operatively connected with the display means and the sensing means, wherein the control means is configured to display content on the display means, display an object corresponding to a handwriting input on the content, based on the handwriting input sensed by the sensing means, in response to a first keyword being recognized based on at least part of the handwriting input, perform character recognition on an additional handwriting input entered after the first keyword, and in response to a character recognition end event being identified, provide text obtained by the character recognition on the additional handwriting input as a hashtag for the displayed content.

An Example 22 may be an electronic device in accordance with example 21, or with any other example described herein, wherein the control means is configured to perform character recognition of a preset number of strokes entered recently of the handwriting input and, based on the preset number of character-recognized strokes corresponding to the first keyword, perform character recognition on a handwriting input made after the first keyword is entered and until before the character recognition end event is identified, and wherein the preset number is a number of strokes of the first keyword.

An Example 23 may be an electronic device in accordance with example 21 or example 22, or with any other example described herein, wherein the character recognition end event includes identifying that the additional handwriting input includes a blank with a preset size or identifying that no handwriting input is entered for a preset time or longer.

An Example 24 may be an electronic device in accordance with example 21 to example 23, or with any other example described herein, wherein the displayed content further includes a preset region for hashtag input, and wherein the control means is configured to, in response to determining that another handwriting input is entered in the preset region based on position information about the another handwriting input on the display means, perform character recognition on the another handwriting input made in the preset region and provide text obtained by the character recognition on the another handwriting input as a hashtag for the content.

An Example 25 may be an electronic device in accordance with example 21 to example 24, or with any other example described herein, wherein the control means is configured to control the display means to display the hashtag in a preset region for displaying a hashtag in the displayed content.

An Example 26 may be an electronic device in accordance with example 21 to example 25, or with any other example described herein, wherein the control means is configured to, in response to an input for deleting the displayed hashtag being entered, delete the displayed hashtag and delete an object corresponding to the hashtag among a plurality of objects displayed on the content.

An Example 27 may be an electronic device in accordance with example 21 to example 26, or with any other example described herein, wherein the control means is configured to, based on the content being a video, identify a frame displayed at a time when the first keyword is recognized among a plurality of frames included in the video and provide text obtained by character recognition of an additional handwriting input made after input of the first keyword and information about the identified frame, as a hashtag for the displayed content.

An Example 28 may be an electronic device in accordance with example 21 to example 27, or with any other example described herein, wherein the control means is configured to display a first user interface for indicating a progress status of the video and, display a second user interface including the obtained text in a region corresponding to a time when the first keyword is recognized on the first user interface, and in response to an input for selecting the second user interface being entered, display from a frame at the time when the first keyword is recognized.

An Example 29 of disclosure may be a method of controlling an electronic device, the method may include displaying content on a display means, displaying an object corresponding to a handwriting input on the content, based on the handwriting input sensed by a sensing means, in response to a first keyword being recognized based on at least part of the handwriting input, performing character recognition on an additional handwriting input entered after the first keyword, and in response to a character recognition end event being identified, providing text obtained by the character recognition on the additional handwriting input as a hashtag for the content.

An Example 30 may be a method in accordance with example 29, or with any other example described herein, wherein performing the character recognition includes performing character recognition of a preset number of strokes entered recently of the handwriting input and, based on the preset number of character-recognized strokes corresponding to the first keyword, performing character recognition on a handwriting input entered after the first keyword is entered and until before the character recognition end event is identified, and wherein the preset number is a number of strokes of the first keyword.

An Example 31 may be a method in accordance with example 29 or example 30, or with any other example described herein, wherein the character recognition end event includes identifying that the additional handwriting input includes a blank with a preset size or identifying that no handwriting input is entered for a preset time or longer.

An Example 32 may be a method in accordance with example 29 to example 31, or with any other example described herein, further comprising displaying the hashtag in a preset region for displaying a hashtag in the displayed content.

An Example 33 may be a method in accordance with example 29 to example 32, or with any other example described herein, wherein providing as the hashtag for the displayed content includes, based on the content being a video, identifying a frame displayed at a time when the first keyword is recognized among a plurality of frames included in the video and providing text obtained by character recognition of an additional handwriting input entered after the first keyword and information about the identified frame, as the hashtag for the displayed content.

An Example 34 may be a method in accordance with example 29 to example 33, or with any other example described herein, wherein providing as the hashtag for the displayed content further includes: displaying a first user interface for indicating a progress status of the video and, displaying a second user interface including the obtained text in a region corresponding to a time when the first keyword is recognized on the first user interface and in response to an input of selecting the second user interface being entered, displaying from a frame at the time when the first keyword is recognized.

An Example 35 of the disclosure may be an electronic device, wherein the electronic device may include a display means (e.g. a display, etc.), a sensing means (e.g. a sensing panel, etc.), a storing means (e.g. a memory, etc.), and a control means (e.g. a processor, a controller, a control circuitry, etc.) operatively connected with the display means, the sensing means, and the storing means, wherein the control means is configured to display content on the display means, display an object, on the content, corresponding to a handwriting input, based on the handwriting input sensed by the sensing means, in response to one of a plurality of keywords, respectively corresponding to a plurality of functions stored in the storing means, being recognized based on at least part of the handwriting input, obtain position information about the keyword entered on the sensing means, and perform a function corresponding to the entered keyword for a region related to the obtained position information of the displayed content based on information about the displayed content.

An Example 36 may be an electronic device in accordance with example 35, or with any other example described herein, wherein the control means is configured to in response to recognizing a first keyword for hashtag input being recognized, display at least one recommendation hashtag in a position where the first keyword is entered and in response to one of the at least one recommendation hashtag is selected, provide the selected hashtag as a hashtag for the displayed content.

An Example 37 may be an electronic device in accordance with example 35 or example 36, or with any other example described herein, wherein based on the displayed content being an application for creating a text document, the recommendation hashtag includes at least one hashtag related to at least one text document previously stored in the storing means.

An Example 38 may be an electronic device in accordance with example 35 to example 37, or with any other example described herein, wherein based on the displayed content being a photo or a video, the control means is configured to recognize an object included in the region related to the obtained position information of the displayed content and recommend a result of the recognition as the hashtag for the displayed content.

An Example 39 may be an electronic device in accordance with example 35 to example 38, or with any other example described herein, further comprising a communication means (e.g. a communication module, a communication processor, a modem, a communication circuitry, etc.), wherein the control means is configured to in response to a second keyword different from the first keyword being entered, transmit the displayed content, the obtained position information, and query information for performing a function corresponding to the entered second keyword to an external server via the communication module and control the display means to display response information received from the external server in the region related to the obtained position information of the displayed content.

An Example 40 may be an electronic device in accordance with example 35 to example 39, or with any other example described herein, wherein the query information is information for displaying a purchase site or an information search for an object included in the region related to the obtained position information.

The electronic device 101 according to various embodiments may be one of various types of electronic devices. The electronic devices may include, for example, a portable communication device (e.g., a smart phone, tablet PC, or e-book reader), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The scope of protection is defined by the appended independent claims. Further features are specified by the appended dependent claims. Example implementations can be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations can be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

The invention claimed is:

1. An electronic device comprising:
   a display;
   a sensing panel;
   a processor and;
   memory storing one or more computer programs including computer-executable instructions that, when executed by the processor, cause the electronic device to:
   display content on the display,
   display an object corresponding to a handwriting input on the content, based on the handwriting input sensed by the sensing panel,
   perform character recognition of a preset number of strokes inputted most recently in the handwriting input, wherein the preset number corresponds to a number of strokes of a first keyword,
   receive next stroke of the handwriting input,
   based on the preset number of character-recognized strokes being not the first keyword, perform character recognition of the preset number of strokes, including the next stroke, inputted most recently in the handwriting input,
   based on the preset number of character-recognized strokes being the first keyword, perform character recognition on an additional handwriting input, including the next stroke, entered after the first keyword, and in response to a character recognition end event being identified, provide text obtained by the character recognition on the additional handwriting input as a hashtag for the displayed content.

2. The electronic device of claim 1, wherein the character recognition end event includes:

identifying that the additional handwriting input includes a blank with a preset size, or identifying that no handwriting input is entered for a preset time or longer.

3. The electronic device of claim 1, wherein the displayed content further includes a preset region for hashtag input, and wherein the one or more computer programs further comprise computer-executable instructions that, when executed by the processor, cause the electronic device to:

in response to determining that another handwriting input is entered in the preset region based on position information about the other handwriting input on the display, perform character recognition on the other handwriting input entered in the preset region, and provide text obtained by the character recognition on the other handwriting input as a hashtag for the content.

4. The electronic device of claim 1, wherein the one or more computer programs further comprise computer-executable instructions that, when executed by the processor, cause the electronic device to control the display to display the hashtag in a preset region for displaying a hashtag in the displayed content.

5. The electronic device of claim 4, wherein the one or more computer programs further comprise computer-executable instructions that, when executed by the processor, cause the electronic device to:

in response to an input for deleting the displayed hashtag being entered, delete the displayed hashtag, and delete an object corresponding to the hashtag among a plurality of objects displayed on the content.

6. The electronic device of claim 1, wherein the one or more computer programs further comprise computer-executable instructions that, when executed by the processor, cause the electronic device to:

based on the content being a video, identify a frame displayed at a time when the first keyword is recognized among a plurality of frames included in the video, and provide text obtained by character recognition of an additional handwriting input entered after input of the first keyword and information about the identified frame, as a hashtag for the displayed content.

7. The electronic device of claim 6, wherein the one or more computer programs further comprise computer-executable instructions that, when executed by the processor, cause the electronic device to:

display a first user interface indicating a progress status of the video and display a second user interface including the obtained text in a region corresponding to a time when the first keyword is recognized on the first user interface, and in response to an input for selecting the second user interface being entered, display from a frame at the time when the first keyword is recognized.

8. A method of controlling an electronic device, the method comprising:

displaying content on a display;

displaying an object corresponding to a handwriting input on the content, based on the handwriting input sensed by a sensing panel;

performing character recognition of a preset number of strokes inputted most recently in the handwriting input, wherein the preset number corresponds to a number of strokes of a first keyword;

receiving next stroke of the handwriting input;

based on the preset number of character-recognized strokes being not the first keyword, performing character recognition of the preset number of strokes, including the next stroke, inputted most recently in the handwriting input;

based on the preset number of character-recognized strokes being the first keyword, performing character recognition on an additional handwriting input, including the next stroke, entered after the first keyword; and in response to a character recognition end event being identified, providing text obtained by the character recognition on the additional handwriting input as a hashtag for the content.

9. The method of claim 8, wherein the character recognition end event includes:

identifying that the additional handwriting input includes a blank with a preset size, or identifying that no handwriting input is entered for a preset time or longer.

10. The method of claim 8, further comprising displaying the hashtag in a preset region for displaying a hashtag in the displayed content.

11. The method of claim 8, wherein the providing as the hashtag for the displayed content includes:

based on the content being a video, identifying a frame displayed at a time when the first keyword is recognized among a plurality of frames included in the video, and providing text obtained by character recognition of an additional handwriting input entered after input of the first keyword and information about the identified frame, as the hashtag for the displayed content.

12. The method of claim 11, wherein the providing of the hashtag for the displayed content further includes:

displaying a first user interface for indicating a progress status of the video and displaying a second user interface including the obtained text in a region corresponding to a time when the first keyword is recognized on the first user interface; and in response to an input selecting the second user interface being entered, displaying from a frame at the time when the first keyword is recognized.

13. An electronic device, comprising:

a display;

a sensing panel;

memory; and a processor, wherein the memory store one or more computer programs including computer-executable instructions that, when executed by the processor, cause the electronic device to:

display content on the display, display an object, on the content, corresponding to a handwriting input, based on the handwriting input sensed by the sensing panel, perform character recognition of a preset number of strokes entered most recently of the handwriting input, the preset number corresponds to the largest number among stroke numbers of a plurality of keywords, receive next stroke of the handwriting input, based on the preset number of character-recognized strokes being not one of the plurality of keywords, perform character recognition of the preset number of strokes, including the next stroke, inputted most recently in the handwriting input, based on recognizing one of the plurality of keywords, respectively corresponding to a plurality of functions stored in the memory, being recognized based on at least part of the handwriting input, obtain position information of the keyword entered on the sensing panel, and perform a function corresponding to the entered keyword for a region related to the obtained position information of the displayed content based on information about the displayed content.

14. The electronic device of claim 13, wherein the one or more computer programs further comprise computer-executable instructions that, when executed by the processor, cause the electronic device to:

in response to a first keyword for hashtag input being recognized, display at least one recommendation hashtag in a position where the first keyword is entered, and in response to one of the at least one recommendation hashtag being selected, provide the selected hashtag as a hashtag for the displayed content.

15. The electronic device of claim 14, wherein based on the displayed content being an application for creating a text document, the recommendation hashtag includes at least one hashtag related to at least one text document previously stored in the memory.

16. The electronic device of claim 14, wherein the one or more computer programs further comprise computer-executable instructions that, when executed by the processor, cause the electronic device to, based on the displayed content being a photo or a video, recognize an object included in the region related to the obtained position information of the displayed content and recommend a result of the recognition as the hashtag for the displayed content.

17. The electronic device of claim 13, further comprising:

a communication module, wherein the one or more computer programs further comprise computer-executable instructions that, when executed by the processor, cause the electronic device to:

in response to a second keyword different from a first keyword being entered, transmit the displayed content, the obtained position information, and query information for performing a function corresponding to the entered second keyword to an external server via the communication module, and control the display to display response information received from the external server in the region related to the obtained position information of the displayed content.

18. The electronic device of claim 17, wherein the query information includes information for displaying a purchase site or an information search for an object included in the region related to the obtained position information.

* * * * *